INVENTORS
E. R. WHEELER
R. HOOVER
R. F. DIRKES
BY Eugene C. Brown
ATTORNEY

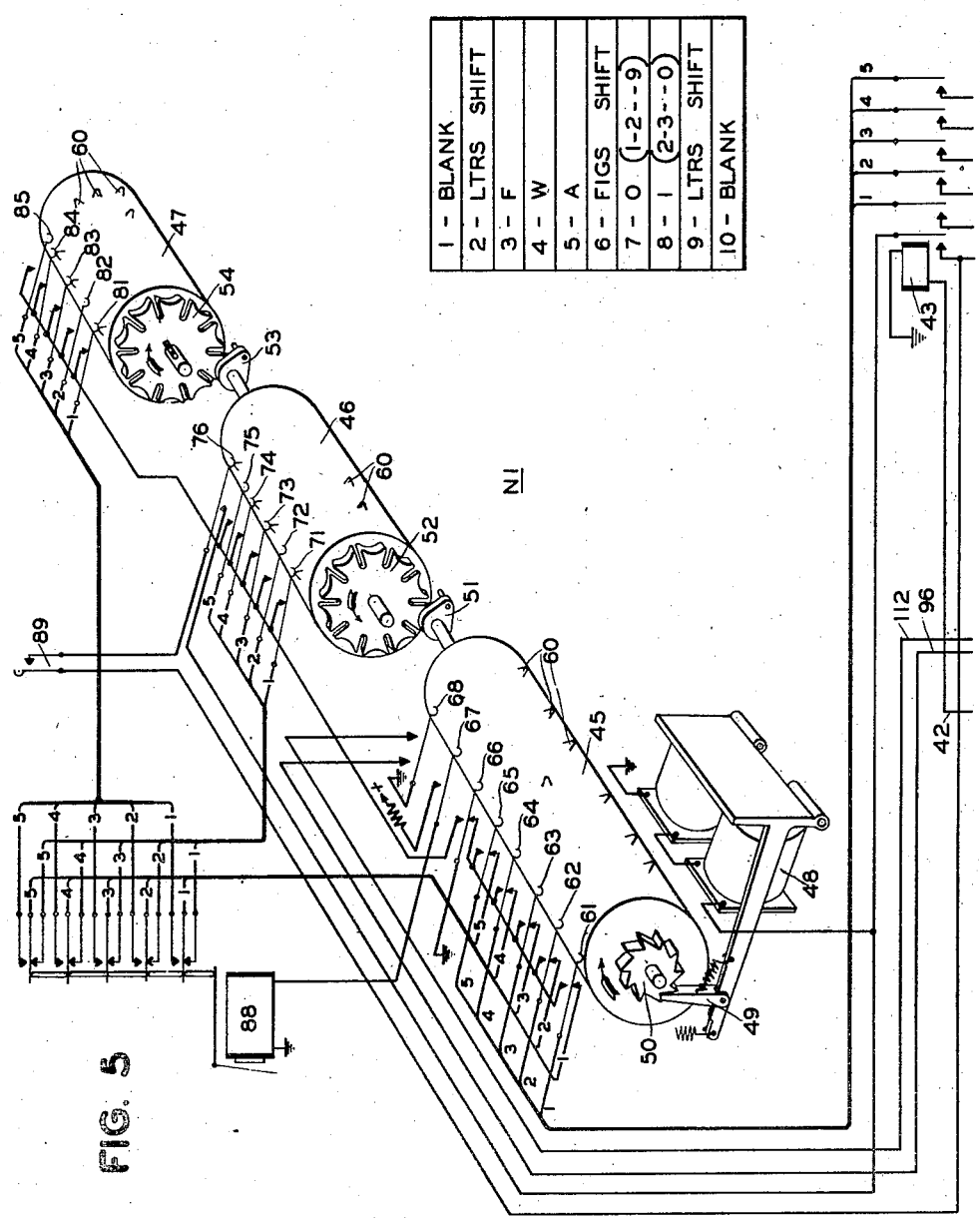

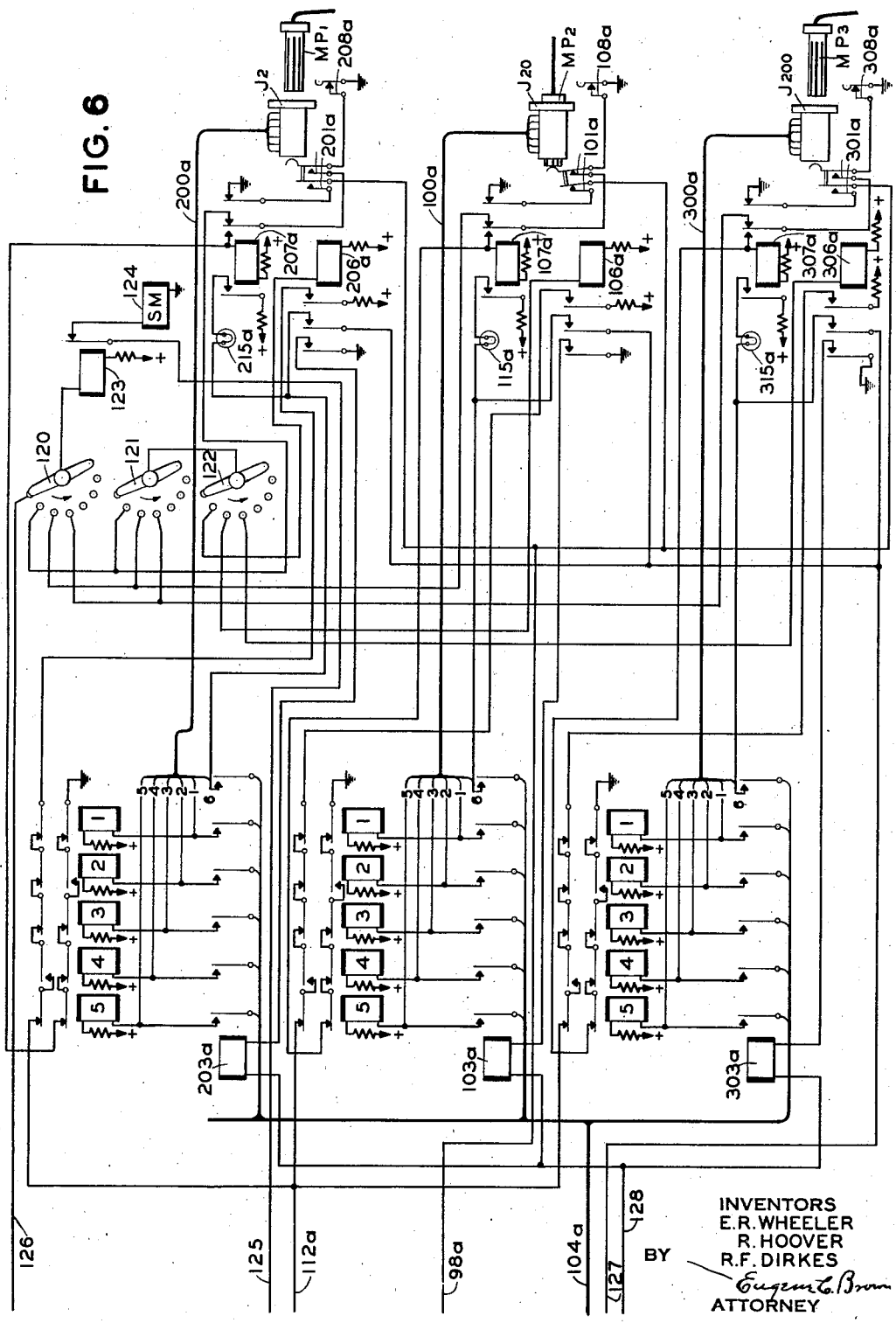

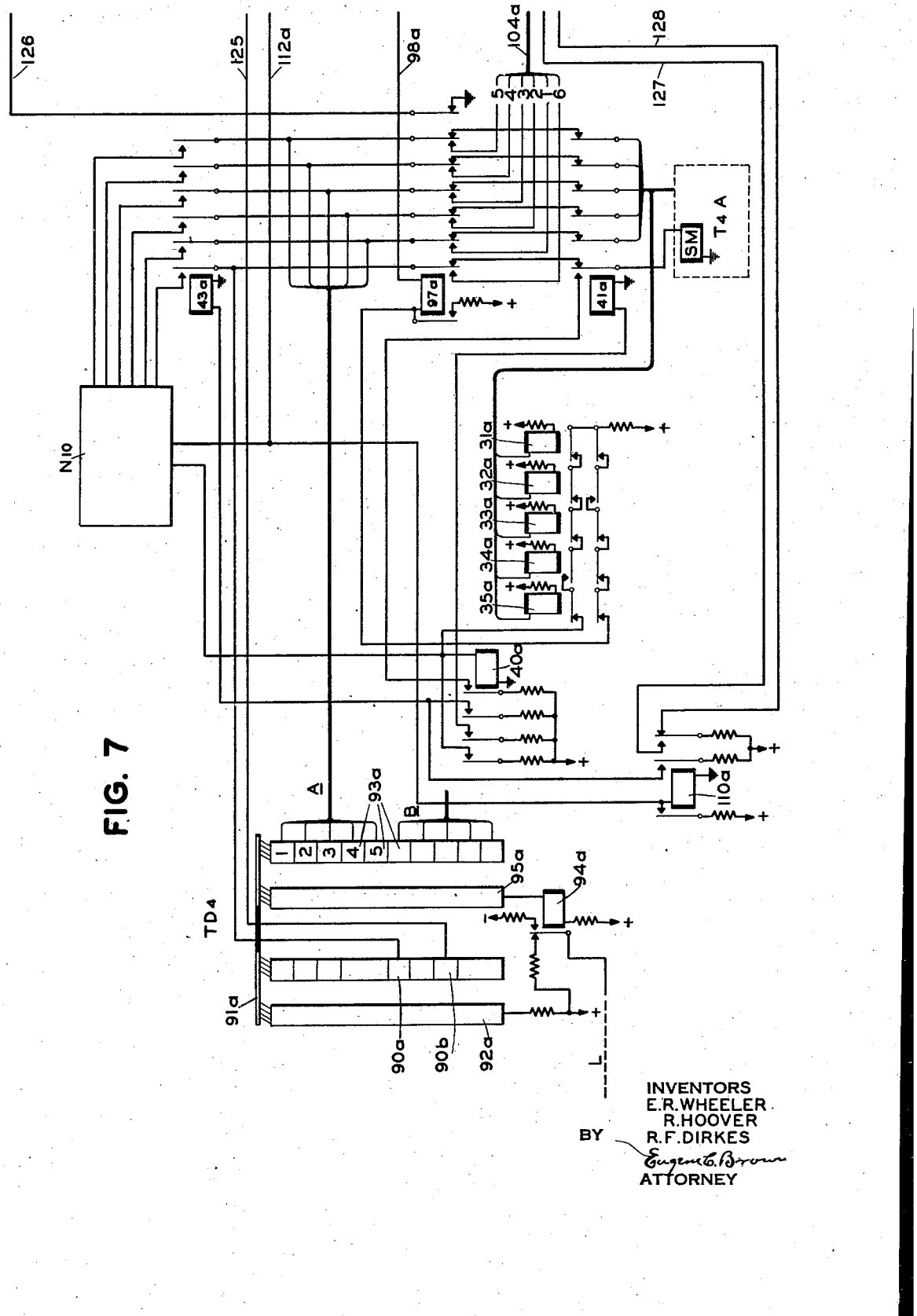

March 19, 1940.  E. R. WHEELER ET AL  2,193,810
TELEGRAPH EXCHANGE SYSTEM
Filed Feb. 24, 1936  9 Sheets-Sheet 8
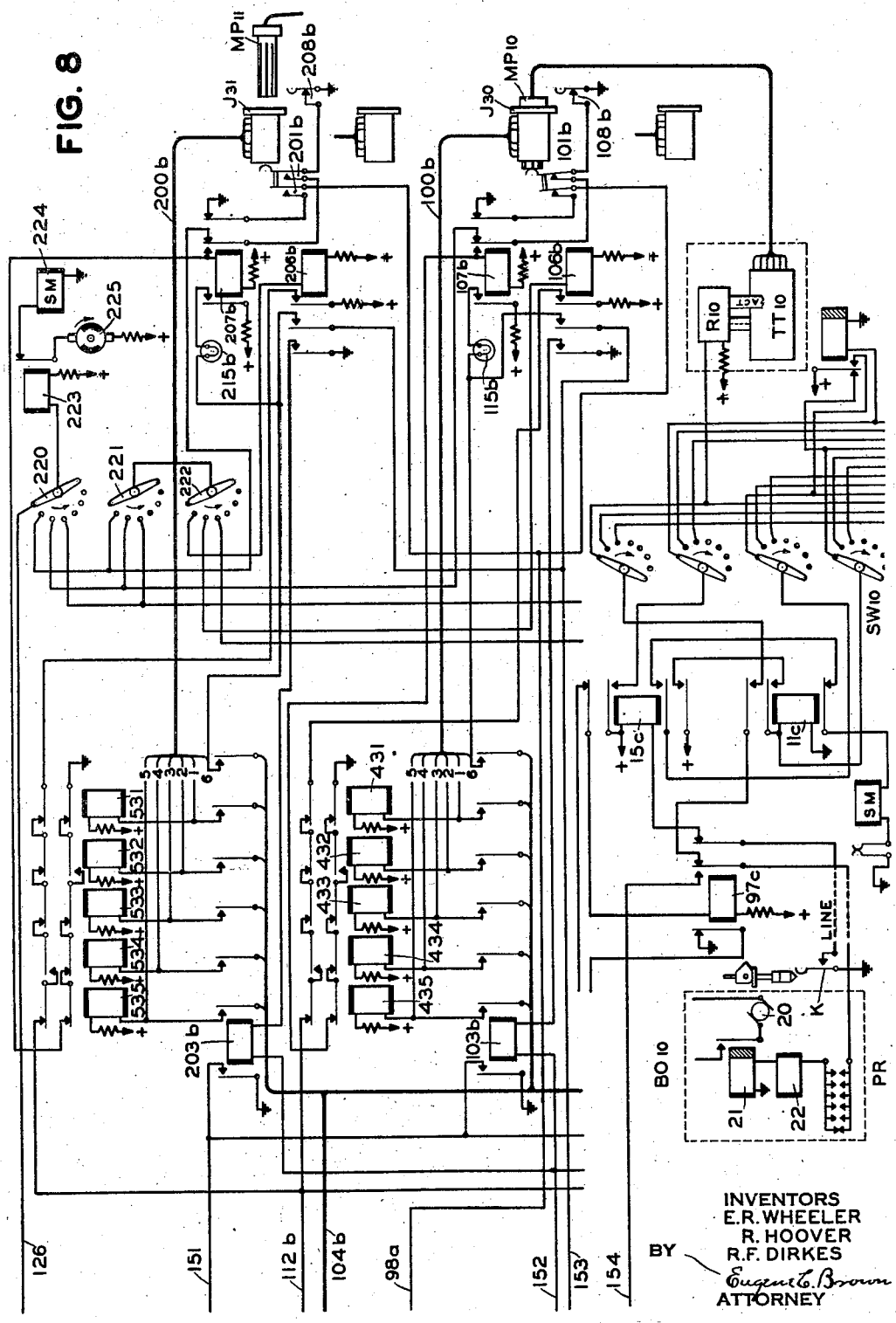
INVENTORS
E. R. WHEELER
R. HOOVER
R. F. DIRKES
BY Eugene E. Brown
ATTORNEY

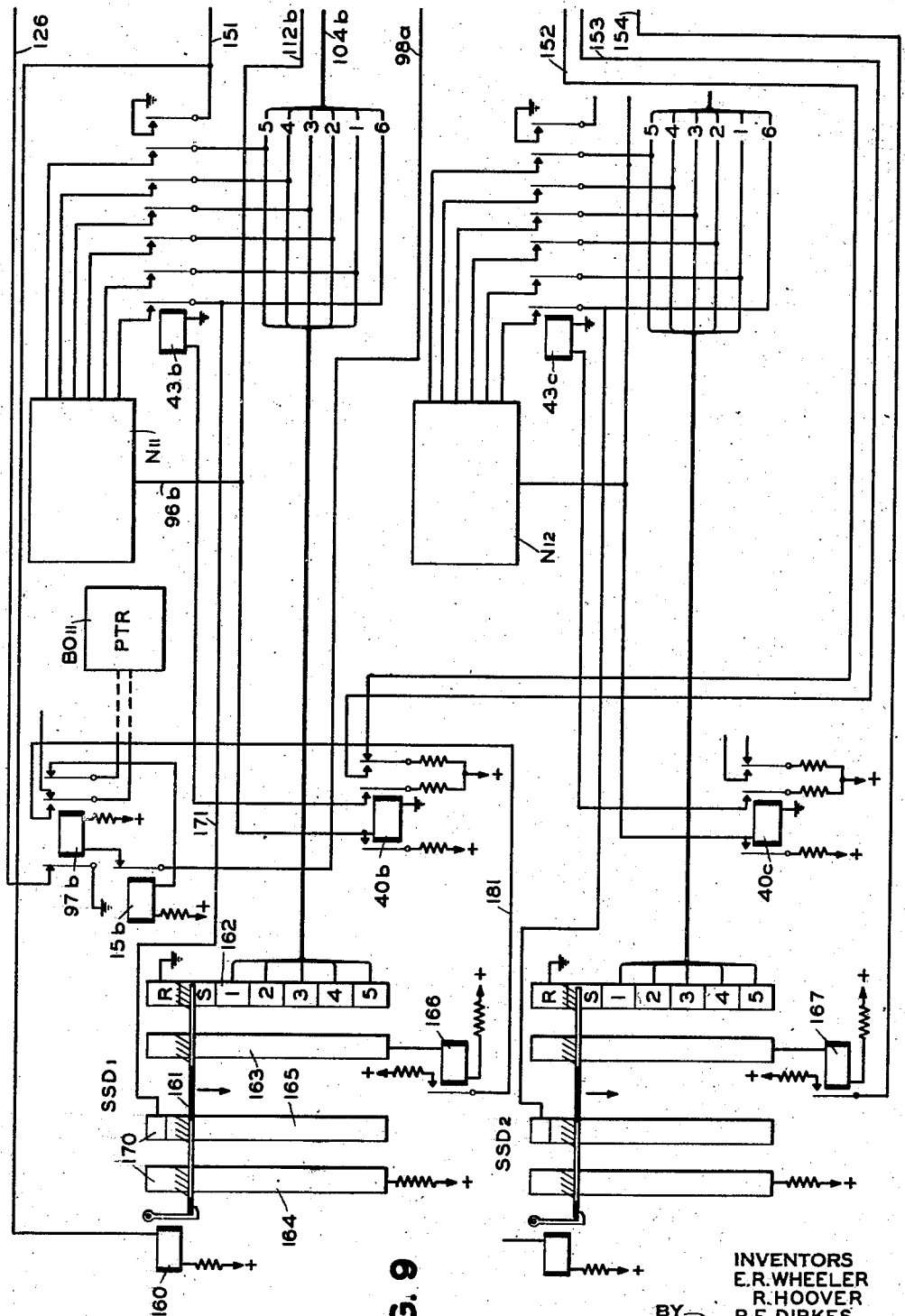

Patented Mar. 19, 1940

2,193,810

UNITED STATES PATENT OFFICE 2,193,810

TELEGRAPH EXCHANGE SYSTEM

Evan R. Wheeler and Ray Hoover, Plainfield, N.
and Robert F. Dirkes, Jamaica, N. Y., assign
to The Western Union Telegraph Compa...,
New York, N. Y., a corporation of New York Application February 24, 1936, Serial No. 65,516

60 Claims. (Cl. 178—2)

This invention relates to methods and apparatus for storing and repeating electrical signals or impulses, and particularly to multi-office telegraph exchange systems embodying means for relaying signals or messages through one or more offices.

In general terms, the object of the invention as applied to printing telegraph systems is to expedite the handling of messages where a direct line or channel is not available between the originating and final offices, for example, where a message originates in a branch office or station connected to a main or central office and must be retransmitted from the central office over one or more channels such as inter-city trunks to reach its destination; to relay messages from branch office simplex or start-stop printers over multiplex channels and vice versa without manual retransmission; and to reduce to a minimum the manual operations involved in relaying messages through an intermediate office while adhering to the present practice of interposing identifying or service code signals between messages to facilitate the tracing of lost or mutilated messages which must be repeated. As will appear, certain features of the invention are not limited to printing telegraph systems of the above-mentioned character.

Prior to this invention, messages originating in branch telegraph offices and destined for a remote office have been transmitted to a printer at the local main or central office. After being received at the central office, the message in printed form was carried manually or by a mechanical conveyor to an operator assigned to a trunk or channel to the distant office and the operator retransmitted the message with a keyboard transmitter or sender connected to said channel. The messages sent over each inter-city channel were numbered consecutively by the operator and the identifying number was transmitted with each message in order to prevent the loss of messages and facilitate the tracing of mutilated or incomplete messages. This method of handling inter-office communication involved several disadvantages, including some delay or "office drag," but possessed the advantages of permitting monitoring of the service at all times, rapid tracing of lost or mutilated messages, flexible routing of messages in case of trunk congestion or tie-up and the proper handling of different classes of services, such as sending full-rate telegrams ahead of deferred messages.

It has been proposed to relay messages from a branch office through the central office with automatic selection of the outgoing channel at the central office under the control of the operator at the branch or originating office, thereby eliminating the necessity for printing and handling the completed message at the central office with the resulting "office drag."

Systems of this character, however, have not been used in practice because they have been exceedingly complicated and therefore expensive to install and maintain, and further because they have lacked certain of the above-enumerated advantages of the manual retransmission system. In addition to the difficulties of tracing messages and handling different classes of service, it is very difficult for the operator at the branch office to route the messages properly in a large multi-office system in view of the large number of channels available and the routing changes necessitated from time to time by temporary overloading of certain channels or by apparatus or line troubles.

In accordance with the present invention, a semi-automatic switching system is provided at the central office arranged to permit messages from a branch or subscriber's office equipped with standard start-stop printers to be transmitted into outgoing trunks or channels, such as synchronous multiplex channels, selected by an operator or attendant at the central office. The switching system may also be arranged to select branch office lines in order to take care of messages destined for local branch offices. In addition, automatic means associated with each outgoing channel or predetermined channels are provided to number the messages sent over each channel so that lost or mutilated messages may be traced. Preferably the outgoing channel may be manually selected whether busy or idle, and is automatically seized as soon as it is idle and released upon completion of the transmission of the message in order to utilize such channels with maximum efficiency. The word "channel" is used herein to designate any communication path, including a metallic circuit, a phantom circuit, a channel of a multiplex, etc. In accordance with a further feature of the invention, code-signal storage devices are provided in the central office for the branch office trunks in order that the message may be cleared out of the branch office without waiting until an inter-city channel becomes idle and in order to simplify transmission from a branch office having a start-stop transmitter into an outgoing multiplex channel at the central office.

In one embodiment of the invention, a number of code-signal storage devices of the mechanical or tape-reperforator type is provided less than the number of branch office trunks and an idle storage device is automatically connected to the calling trunk when a message is to be sent from a branch office. Each storage device has associated therewith a transmitter for repeating the stored signals and switching means are provided under the control of the operator at the central office whereby the operator, after noting the destination of the message, may connect the transmitter to the proper outgoing channel or communication circuit. The manually operable switching means may, for example, include a multiple-conductor plug having a plurality of contacts connected to the transmitter terminals, the plug being adapted to be inserted in jacks connected to the respective outgoing channels. In large offices, the jacks may be multipled to several switching positions and means are provided for rendering the transmitters operative in sequence when more than one is plugged into the same channel. Ordinarily each channel or outgoing communication circuit has associated therewith a local sending position in the central office and therefore means are provided whereby upon completion of the transmission of a message from a local position, the channel is connected to the switchboard if a stored message is waiting to be sent over said channel.

The establishment of the connection to an outgoing channel by an operator at the central office permits monitoring of the service and the switching of deferred messages to a local position for relaying at a subsequent time. The operator's duties primarily consist in plugging the storage-transmitters into the proper jacks upon reception of messages at the central office and breaking down the connection upon receiving a signal that transmission of a message over the outgoing channel has been completed. The tracing of messages is rendered possible by the numbering of the messages, as described above, the numbering mechanism being preferably arranged to transmit also code signals identifying the channel and city of destination, or any other desired information.

The semi-automatic switching system embodying the present invention in which an operator at the central office selects the outgoing channels or circuits for messages originating at branch or subscribers' offices or reaching the central office over other incoming channels, permits message routing under the direct supervision of a trained traffic employee having information and routing instructions that are not available to the outside office operators. In the event of line or equipment trouble or the overloading of direct channels to a certain destination, instructions for the rerouting of messages may be immediately put into effect and traffic moved with the minimum delay. There is also more latitude in routing messages to small towns which are not directly connected by channel with the originating central office. A directory listing all the cities and towns connected to the system with correct routing for messages sent to them would be very large and unwieldy for branch operators to use. It is thus highly desirable to centralize the routing of messages in a relatively small group of specially trained central office employees.

Other objects and advantages of the invention will appear from the following description of the embodiments thereof shown in the accompanying drawings wherein:

Figs. 3, 4 and 5 are circuit diagrams of the switchboard circuits and associated numbering and control apparatus of the system shown in Fig. 1;

Figure 2:
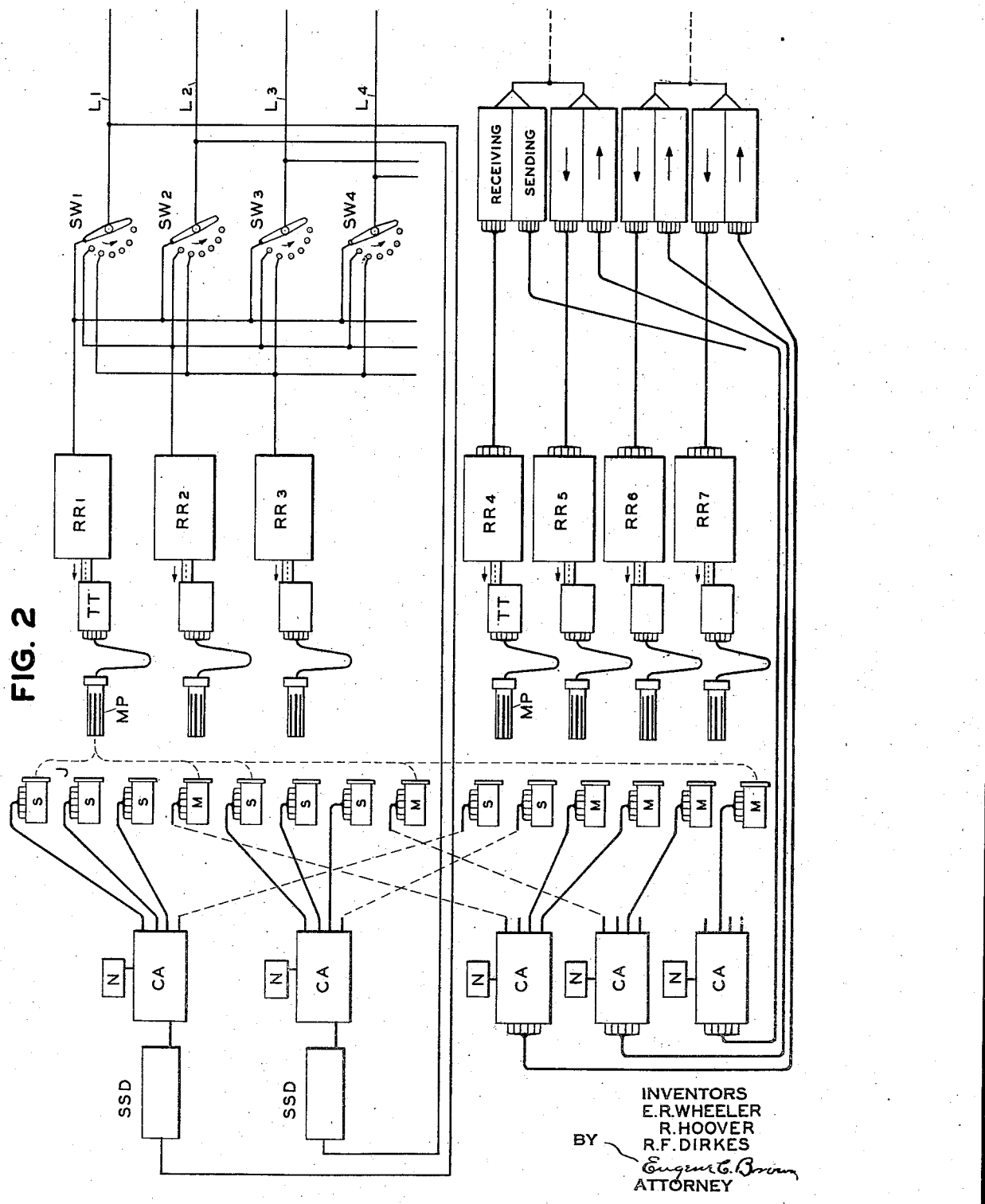
Fig. 2 is a similar view of a modified system.
Figure 3:
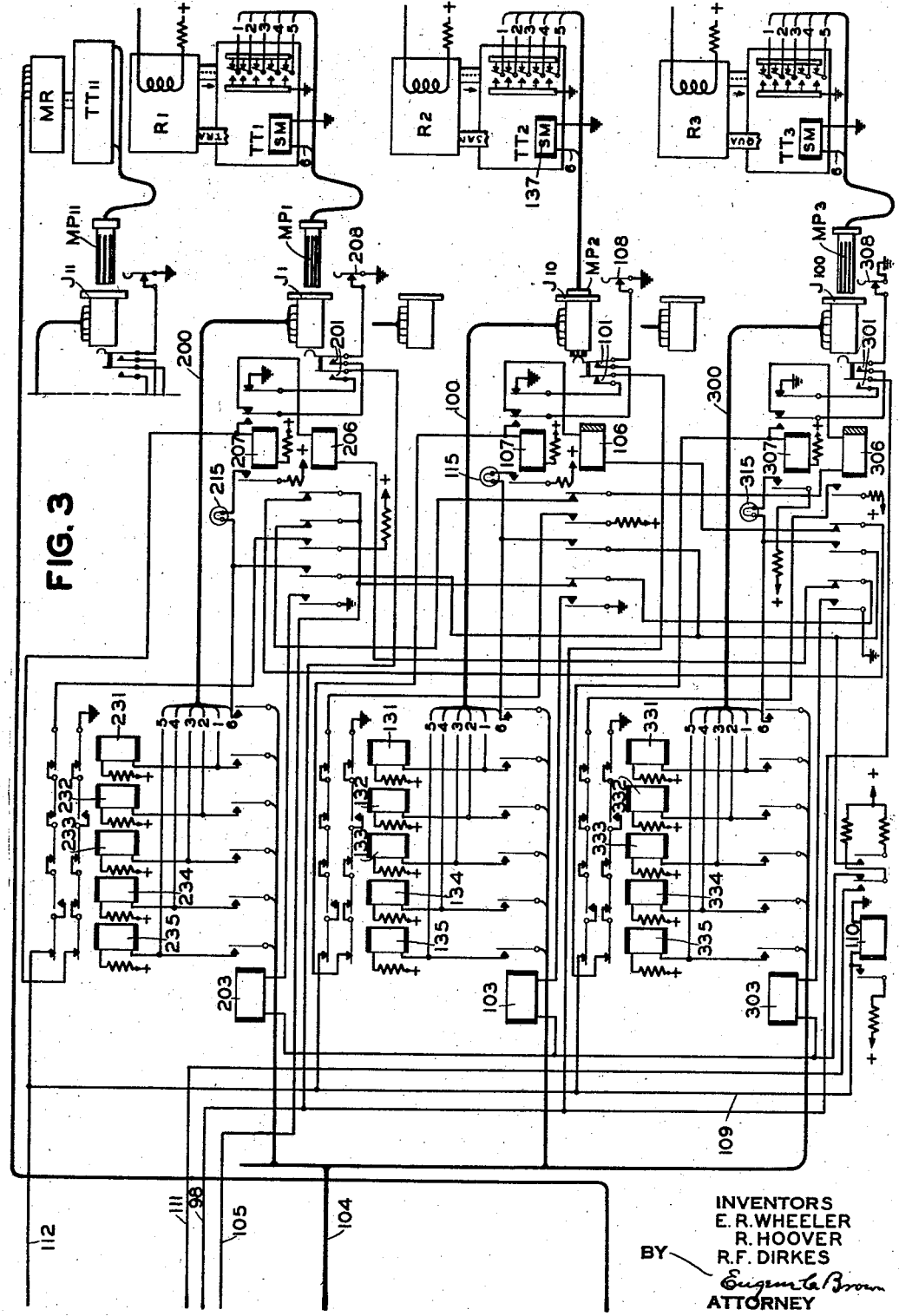
Figure 4:
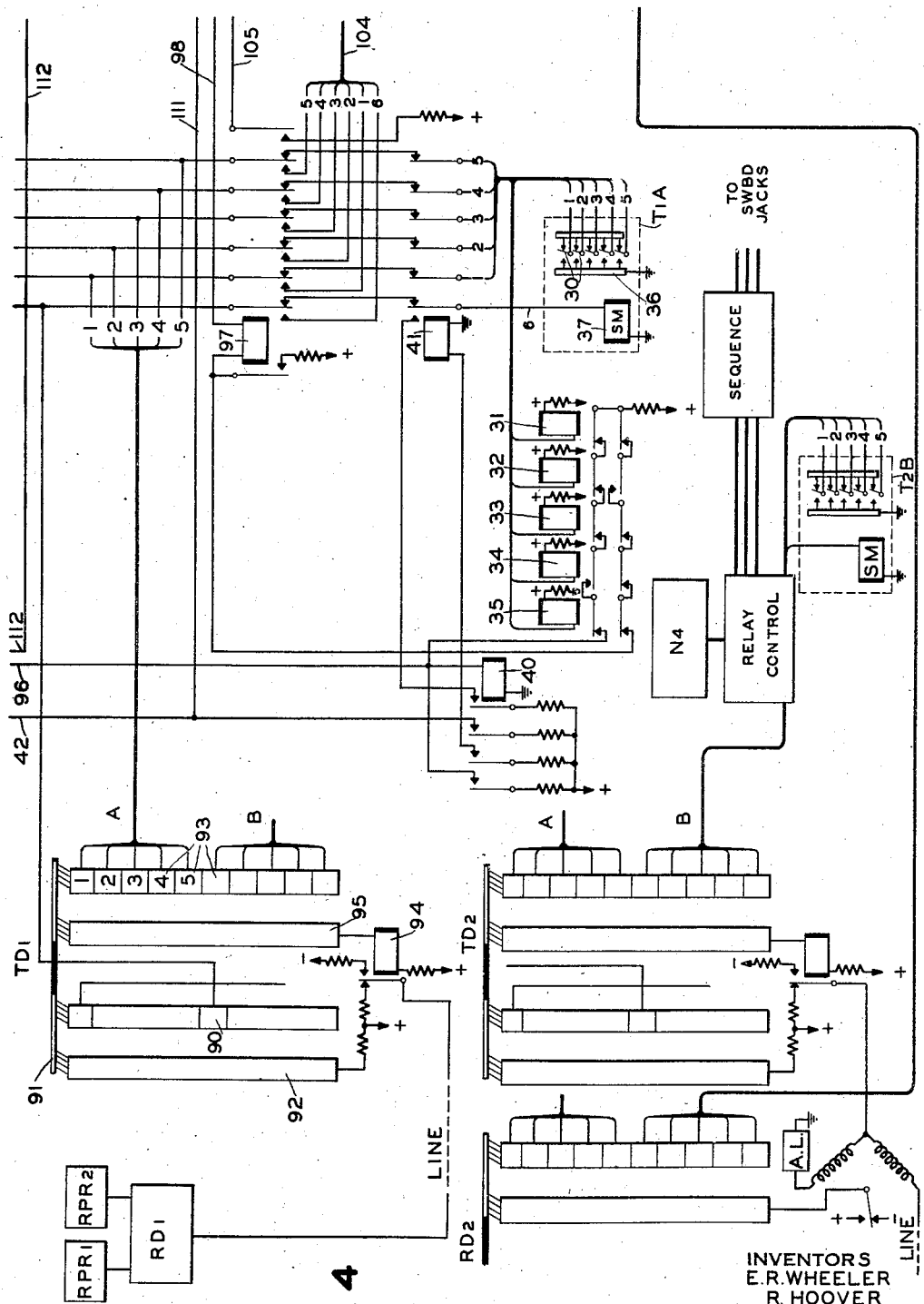

Figs. 6 and 7 are circuit diagrams of a modification of the system shown in Figs. 3, 4 and 5; and Figs. 8 and 9 are circuit diagrams of the modified system shown in Fig. 2 omitting parts of the system which are similar to the circuits and apparatus of Figs. 3, 4 and 5 or of Figs. 6 and 7.

Figure 1:
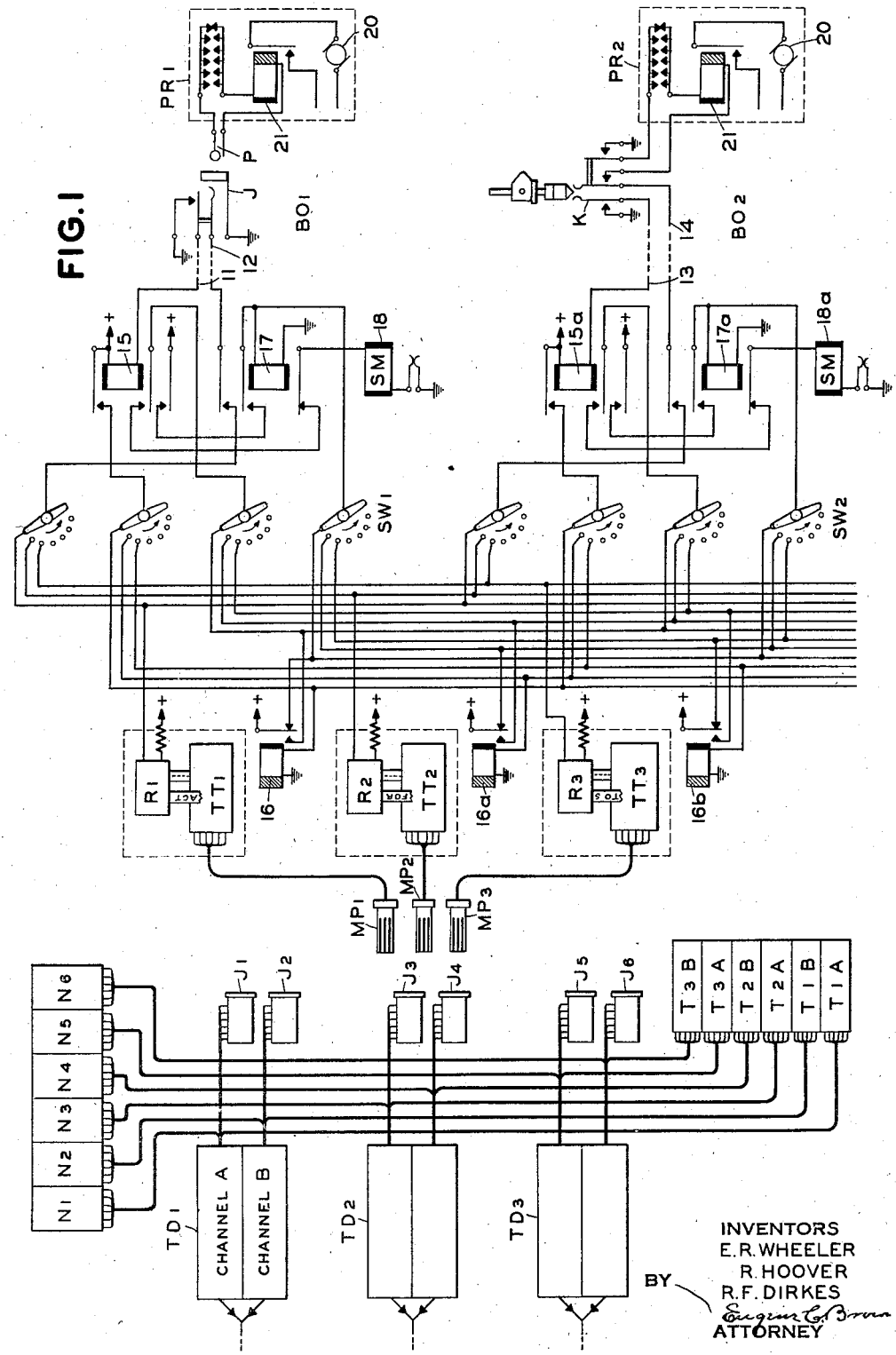
Fig. 1 is a diagrammatic view of the general arrangement of the system, the circuits of the finder switches for connecting branch office lines to an idle storage-transmitting device at the central office being shown in detail.

Referring to Fig. 1, a plurality of branch or subscribers' offices BO1, BO2 are connected to the central office by conductors 11, 12 and 13, 14, respectively. The printer PR1, provided for example with a start-stop or simplex transmitter, is connected to the line 11, 12 by inserting the plug P into the jack J. The printer PR2 at the second branch office may be connected to the line 13, 14 by actuating a key K. The branch office printers may be similar to the Model 14 tape teletype described in Bulletin No. 126 of the Morkrum-Kleinschmidt Corporation.

The messages transmitted to the central office from the branch or subscribers' offices are stored by recording or storing devices R1, R2, R3, which may be, for example, combined printers and tape reperforators of the type shown in the patent to Rothermel, No. 1,936,956, dated November 28, 1933, or that shown in the copending application of Robert F. Dirkes and Evan R. Wheeler, Ser. No. 42,692, filed September 28, 1935. These combined printers and reperforators print the message characters received and also reperforate a tape in such manner that when the tape is passed through a tape transmitter, the message signals will be repeated. Each reperforator may be provided with mechanism similar to that shown in the patent to Dirkes and Kimball, No. 1,931,790, dated October 24, 1933, for advancing the tape therethrough at the end of each message group of signals. Tape transmitters TT1, TT2, TT3, for example of the type shown in the patent to Benjamin, No. 1,298,440, dated March 25, 1919, are associated with the respective signal storing devices for repeating the signals stored in the tape. Other forms of signal storing and repeating apparatus may be employed instead of the reperforator and tape transmitter, if desired, such as mechanical, electrical or magnetic storage transmitters. The signals may also be stored in the form of visible marks or the like on a tape, ribbon or other recording member.

Each of the branch office lines may be connected to a storage unit or reperforator individual to that line. Where the system comprises a relatively large number of lines or the traffic is light, however, a number of reperforators less than the number of lines is provided, and finder switches SW1, SW2 on the respective lines are arranged to connect an idle reperforator to the branch office line when a message is waiting to be transmitted in a manner similar to that employed in the traffic-concentrating systems of the prior art, such for example as that shown in the patent to Blanton, No. 1,928,586, dated September 26, 1933. Upon the insertion of the plug P in the jack J, the conductor 11 is grounded at the contacts of the jack thereby energizing relay 15. If the reperforator R1 is idle, slow release relay 16 is deenergized and, assuming that the contact arms of switch SW1 are initially in the position shown, a circuit is closed through the armature and back contact of relay 16, the lower contact arm of switch SW1 and the winding of relay 17. Relay 17 becomes energized and closes a locking circuit through its second armature and front contact and the lower armature and front contact of relay 15 that is independent of relay 16. Relay 17 opens at its lower armature and back contact the circuit of the stepping magnet 18 of switch SW1 and closes through its upper armature and front contact the transmitting circuit from the printer PR1 to the reperforator R1. The printer motor 20 starts in response to the energization of slow release relay 21 in the transmitting circuit, indicating to the operator that connection has been made to a reperforator at the central office. The starting of the printer motor at the branch office or the operation of a signal to indicate that a connection has been made to receiving apparatus at the central office are features that are disclosed in the prior art, including the above-mentioned Blanton patent. Relay 16 becomes energized through a circuit including the third contact arm of switch SW1 and the upper armature and front contact of relay 15, thereby indicating that the reperforator R1 is busy if another finder switch attempts to connect a printer to said reperforator.

If, for example, the printer PR2 is connected to the central office by actuating the key K when the contact arms of switch SW2 are in the position shown, relay 17a does not become energized because the circuit thereof is open at the contacts of relay 16 and upon the energization of relay 15a, the circuit of stepping magnet 18a is closed through the lower armature and back contact of relay 17a, the second armature and front contact of relay 15a, the second contact arm of switch SW2 and the armature and front contact of relay 16. The energization of stepping magnet 18a steps the contact arms of switch SW2 to the next series of back contacts, and the switch continues to step until an idle reperforator is reached. Likewise, if the reperforator R1 had been busy when the printer PR1 had been connected to the line 11, 12, the stepping magnet 18 would have been energized through a circuit including the armature and front contact of relay 16, causing the switch SW1 to hunt an idle reperforator.

The message transmitted by the operator at the branch office BO1 is printed and stored in the perforated tape at the reperforator R1. After the transmission of the message has been completed, the plug P is withdrawn from the jack J, thereby interrupting the circuit of relay 15 whereupon relays 16 and 17 become deenergized and the reperforator R1 is released until subsequently seized by the same or another branch office line. If the reperforator R1 is idle when another message is to be transmitted from branch office BO1, the reperforator is seized without stepping the switch SW1.

When a message is received upon one of the reperforators R1, R2, R3, an operator or attendant at the central office notes the destination of the message and connects the associated tape transmitter TT1, TT2 or TT3 to the proper outgoing channel. In the embodiment shown, a cord circuit terminating in a multiple conductor plug MP1, MP2 or MP3 is provided for each of the transmitters TT1, TT2 and TT3. A switchboard at the operator's position contains multiple conductor jacks J1, J2—J6 providing access to outgoing channels, such as channels A and B of the multiplex transmitting distributors TD1, TD2, TD3. The multiplex channels are also accessible from the local sending position provided with tape transmitters T1A, T1B, T2A, T2B, etc. If one of the latter transmitters is sending over a channel when one of the repeater transmitters TT1, TT2 or TT3 is plugged into the same channel, the repeater transmitter is maintained inoperative until the transmission of the first message is completed. The repeater transmitter is then connected to the selected channel and, if more than one repeater transmitter is connected at the same time to the same channel, they are rendered operative in sequence, as described hereinafter. After the messages awaiting transmission at the switchboard have been sent, the outgoing channel is reconnected to the local transmitter. The duties of the central office switching operator are therefore substantially confined to noting the destination of messages received on the reperforator or storage means, plugging the repeater transmitters into the proper outgoing channels and breaking down the connections after transmission has been completed. A service code signalling or numbering mechanism N1, N2—N6 is associated with each outgoing channel and is arranged to append to successive messages over any one channel consecutive numbers and other desired service characters to facilitate the tracing of lost messages or for other purposes.

If desired, the system shown diagrammatically in Fig. 1 may be extended to include the interconnection of the branch office simplex lines, and the interconnection of incoming multiplex channels or other form of inter-city trunk with outgoing channels or branch office simplex lines. In that case the incoming circuits or channels, both simplex and multiplex, terminate in storage and repeating equipment which may be connected through the switchboard or other selective switching apparatus at the central office to any of the local branch office lines or the inter-city trunks terminating at the office, thereby providing a flexible system adapted to take care of all the messages to be repeated through the central office.

The general arrangement of a system of this character embodying the invention is shown in Fig. 2. In this system the branch office lines L1, L2, L3 and L4, which are generally connected to simplex printers at the branch offices, are connected through the finder switches SW1, SW2, SW3 and SW4 to the storage units or receiving reperforators RR1, RR2, RR3, as in the system shown in Fig. 1. Messages sent from the branch offices are stored on the reperforators which have associated therewith tape transmitters TT connected to multiple conductor plugs MP for repeating the stored messages over a selected channel.

The jacks J of the switchboard adapted to receive the multiple conductor plugs MP, however, provide access both to outgoing simplex lines to branch offices and also to the transmitting channels of circuits to remote offices. In the drawings, the jacks providing access to simplex lines are designated s and those providing access to inter-office trunks are designated m. These jacks may be arranged in various ways; for example, they may be multipled before two or more operators' positions and preferably both simplex and multiplex jacks are disposed at each position so that any tape transmitter TT may be connected to any of the simplex lines or multiplex channels terminating at the central office.

In the case of a message destined for one of the branch offices, the tape transmitter TT is plugged into a jack J individual to said office and the message is repeated over the branch office line under the control of the control apparatus CA and the start-stop distributor SSD, the latter unit being arranged to add synchronizing impulses to each code signal in order to operate a start-stop printer at the branch office. The numbering machine or service code transmitter N is arranged to append to each message a number and other service code signals of any desired character.

In the case of a message destined for one of the channels of the inter-office trunks, the tape transmitter is plugged into a jack J individual to said channel, whereupon the tape transmitter is rendered operative under the control of the control apparatus CA to repeat the message over said channel. The message is numbered by the numbering machine N. The numbering of messages may be omitted in the case of messages to either branch offices or multiplex channels or in both cases, if desired.

In the case of incoming messages received over the inter-city channels, the messages are stored by the storing units or receiving reperforators RR4, RR5, RR6 and RR7 individual to the respective channels. In connection with multiplex channels, the reperforators RR4, RR5, RR6 and RR7 may be similar to that disclosed in the patent to Hoover and Haupt, No. 1,851,838, granted March 29, 1932, or may be combined printers and reperforators similar to that disclosed in the copending application of R. F. Dirkes and R. Wentworth, Ser. No. 135,326, filed April 6, 1937. The operator or attendant after noting the destination of the message from the perforated or printed page, plugs the associated tape transmitter TT into the proper jack J whereupon the message is repeated in exactly the same manner as in the case of messages originating at the branch offices. It will be noted that the system described has the advantage that the code signal repeating apparatus and the switchboard circuits except for minor changes in the control apparatus CA are identical for all circuits interconnected through the exchange.

One form of switching, numbering and control apparatus applicable to the system shown in Fig. 1 is illustrated in detail in Figs. 3, 4 and 5. The switchboard plugs MP1, MP2 and MP3 associated with the repeater transmitters TT1, TT2 and TT3 respectively in Fig. 3 are shown as in Fig. 1. The jacks J1, J10 and J100 shown in Fig. 3, however, are each individual to the same outgoing channel A of multiplex distributor TD1 to illustrate the manner in which transmitters plugged into the same channel at the same time are rendered operative one at a time. The circuits and apparatus associated with similar jacks allocated to other outgoing channels are similar to those illustrated and for the sake of simplicity are not shown in detail in Figs. 3, 4 and 5. The plug MP11 and jack J11 provide for the interconnection of an incoming multiplex channel and one of the outgoing channels.

The transmitters T1A and T2B (Fig. 4) at the local sending position are individual to channel A of multiplex distributor TD1 and channel B of multiplex distributor TD2 respectively. The service code transmitter or numbering mechanism N1 individual to channel A of transmitting distributor TD1 is shown in Fig. 5 and the corresponding service code transmitter N4 individual to channel B of multiplex distributor TD2 is indicated diagrammatically in Fig. 4. It is to be understood that a transmitter similar to the transmitter N1 is associated with each of the outgoing channels although each transmitter is preferably arranged to send a different group of service code signals as explained below.

In order to summarize briefly the general operation of the system and apparatus illustrated in Figs. 3, 4 and 5, it may be assumed that one or more than one message destined for channel A of multiplex distributor TD1 has been stored in the tape in one or more of the reperforators R1, R2, R3. The switching operator notes the destination of the first message on each tape and plugs the tape transmitter TT1, TT2 or TT3 into one of the jacks J1, J10 or J100 allocated to the proper outgoing channel. If more than one reperforator has recorded a message for said channel, the associated transmitters may be plugged into separate ones of said jacks at the same time and the transmitters will be rendered operative to repeat the messages one after the other.

The local tape transmitter T1A of channel A of distributor TD1 is normally connected to said channel to transmit messages thereover from the local position. If, however, a message or messages for said channel have been received from one or more branch offices upon the reperforators R1, R2, R3, the transmitter T1A is disconnected from the channel at the end of a message and the channel is automatically connected to the switchboard to clear out the message or messages stored by the reperforators. After the messages awaiting transmission over said channel at the switchboard have been sent, the local transmitter T1A is automatically reconnected to the channel and a signal is operated to notify the switching operator to withdraw the connecting plug in the switchboard associated with the repeater transmitter which has completed its function. Each message transmitted over channel A of distributor TD1, whether it originated at the local position or at one of the branch offices, is preceded by service code signals from the transmitter N1 (Fig. 5) whereby successive messages may be given consecutive numbers or other desired code signals may be appended to the messages. The equipment associated with channel A of distributor TD1 is typical of that provided for each channel, the transmitting and control apparatus associated with channel B of distributor TD2, for example, and shown in condensed diagrammatic form in the lower half of Fig. 4, being of the same character as that shown in detail in connection with the first-mentioned channel.

In the embodiment of the invention shown, each message character is represented by signals of the five-unit code and each message group of signals is preceded by a signal consisting of three spacing impulses, a marking impulse and a spacing impulse, and followed by an end-of-message signal consisting of a spacing impulse, a marking impulse and three spacing impulses. The spacing impulses, for example, may consist of no-current intervals and the marking impulses may be current impulses, or they may be of opposite polarity as desired.

Assuming that a message is to be transmitted from the tape transmitter T1A to the receiving printer RPR1 at the remote office and no message for the same channel is awaiting transmission at the switchboard, the first arbitrary signal described above is sent by the transmitter. The transmitter T1A may be similar to the tape transmitter described in the above-mentioned patent to Benjamin, No. 1,298,440, and is provided with a grounded marking busbar 36 and a stepping magnet 37 for stepping the tape. The transmitting contacts 30 of transmitter T1A are connected to five baffle relays 31, 32, 33, 34 and 35. The transmitting contacts 30 are also connected through armatures and back contacts of relays 41 and 97 to segments of the transmitting ring of distributor TD1. The stepping magnet 37 is likewise connected through an armature and back contact of relays 41 and 97 to a local segment on distributor TD1. The transmission of the special signal in which the fourth pulse is a marking impulse causes the energization of relay 34, thereby closing a circuit through the upper armatures and back contacts of relays 31, 32 and 33, the upper armature and front contact of relay 34 and the upper armature and back contact of relay 35 for energizing relay 40. It will be apparent that this circuit will not be closed upon the transmission of any other code signals from the transmitter T1A corresponding to the characters forming the message.

Relay 40 becomes energized and closes a locking circuit through its left hand outer armature and front contact whereby the relay remains energized after the initial energizing circuit is interrupted. Relay 40 further closes through its third armature and front contact the circuit of relay 41, whereupon the latter becomes energized and disconnects the transmitter T1A from the distributor TD1 until the numbering mechanism N1 has completed its function. Upon the energization of relay 41, a circuit is closed through the inner armatures and front contacts of relays 40 and 41 for energizing the stepping magnet 37 of the transmitter T1A. The tape in the transmitter is stepped to present the next code combination but the contact tongues 30 remain on the spacing bus-bar until the magnet 37 becomes deenergized as described below.

The energization of relay 40 also closes through its second armature and front contact and conductor 42 a circuit for energizing relay 43 (Fig. 5) whereupon this relay becomes energized and connects the numbering mechanism N1 to the transmitting segments of distributor TD1. The numbering mechanism may be constructed in various ways but the modification shown is similar to that described in the copending application of Dirkes, Hoover and Wheeler, Ser. No. 51,522, filed November 25, 1935. In the preferred form illustrated, the device comprises three rotatable code drums, a letters code drum 45, a units code drum 46 and a tens code drum 47 adapted to be positioned by a stepping magnet 48 operatively connected to a pawl 49 arranged to actuate a ratchet wheel 50 secured to the letters code drum 45.

The code drum 45 is arranged to make one complete revolution during each cycle of operation and assumes ten different angular positions determined by the teeth on the ratchet wheel 50 during each cycle. The number of signals sent in the service code group corresponds to the number of positions assumed by the drum 45. The units code drum 46 is driven through suitable mechanism such as a Geneva cam 51 and Geneva wheel 52 arranged to step the drum 46 one-tenth of a revolution during each revolution of the drum 45. The drum 46 is similarly connected through a Geneva cam 53 and Geneva wheel 54 to the tens code drum 47 so as to step the drum 47 one-tenth of a revolution after ten revolutions of the drum 45.

Each of the code drums is provided with suitably arranged contact-actuating cam members or pins 60 which may be threaded into the drums, if desired, and are adapted to actuate contact members 61—66 associated with the drum 45, contact members 71—76 associated with the drum 46 and contact members 81—85 associated with the drum 47 to open and close circuits in accordance with the positions of said drums whereby predetermined code combinations are set up on the segments of the distributor TD1 during the operating cycle of the numbering mechanism. Each group of service code signals comprises invariable signals of predetermined character corresponding to characters or letters and to printer functions and also variable signals corresponding to numerals. The numerals sent to the receiving printer comprise two digits, the units digit being changed in each cycle of operation from 1 to 2, 3—9, 0 and the tens digit being changed after each ten cycles from 0 to 1, 2—8, 9 whereby consecutive messages are numbered from 01 to 99 or (1)00. It will be apparent that by changing the positions of the pins 60, the fixed and variable code signals may be readily changed if desired.

The numbering mechanism further comprises a relay 88 having five armatures connected to the break contacts of the transmitting contact members 61—65 and a key 89 for automatically restoring the units drum 46 to normal. The groups of front and back contacts of relay 88 are connected respectively to the contact members 71—75 and 81—85 whereby the transmitting circuits may be placed successively under the control of the tens and units code drums.

After the numbering mechanism has completed one or more cycles, it may be desired to restore the tens and units code drums to normal in order that the next message may be numbered 01 or some other predetermined number. The contact 76 of the units drum 46 is closed in all positions of the drum except the normal or starting position. If the drum has been rotated from the normal position, therefore, upon actuating the restoring key 89, a circuit is closed through the windings of the stepping magnet 48, contact member 76 of units code drum 46, key 89, local segment 90 of the distributor TD1, brush 91 and ring 92 to battery, whereby the stepping magnet 48 is periodically energized during the rotation of brush 91. The step-by-step rotation of drums 45 and 46 by the magnet 48 continues until the drum 46 reaches its normal position where the contact member 76 is actuated to interrupt the circuit of the magnet. The tens code drum 47 is preferably restored to normal manually by disengaging the Geneva wheel 54 from the cam 53 and turning the drum to its normal position.

When the numbering mechanism N1 is connected to the transmitting distributor TD1 of the outgoing trunk by the energization of relay 43, as described above, the circuit of stepping magnet 48 is closed through the inner armature and front contact of relay 43 to the local segment 90 of the distributor. As the brush 91 of the distributor passes over the transmitting segments 93, spacing impulses are first sent to the line since the conductors connected to the segments 93 are open-circuited at the contacts 61—65 of the cam drum 45. As shown, the usual line relay 94 is interposed between the line conductor to the remote office and the transmitting ring 95 of the distributor. The circuit of stepping magnet 48 is then closed through segment 90 and, as the distributor brush 91 breaks contact with the local segment 90, the cam drum 45 is stepped to its second position. In a similar manner, the cam drum 45 is rotated step-by-step as the brush 91 contacts with the local segment 90 during each rotation of the distributor brushes until the drum has made a complete revolution.

In the successive positions of the drum 45 various permutation code signals are sent over the line by applying or removing ground potential from the transmitting segments 93 of channel A through the contact members 61—65 of the drum. In the embodiment shown, in the second position of cam drum 45, predetermined contact members of the group 61—65 are actuated to connect certain of the transmitting segments 93 to ground through contact member 66 to send a code signal corresponding to "letters shift." The receiving printer RPR1 is thus positioned to print letter characters. In the third, fourth and fifth positions of the drum 45, the contact members 61—65 are selectively positioned to send code signals representing the characters F, W and A, which it may be assumed refer to the identity of the originating office (FW) and the transmitting channel (A) to the remote office. The letters F, W and A are thus printed by the receiving printer in advance of the message group of signals. The pins 60 in the letters code drums of the numbering mechanisms N2, N3, etc., are so arranged as to set up code combinations representing their associated channels or other desired characters.

In the sixth position of the code drum 45, the contact members 61—65 are positioned to cause the distributor TD1 to send the code signal representing "figures shift" over the line, whereupon the receiving printer RPR1 is positioned to print figures. In the seventh position of the code drum 45, the contact members 61—65 are in contact with their respective back contacts and contact members 66 and 67 are operated, thereby energizing relay 88 and applying ground potential to the make contacts of contact members 71—75 and 81—85 of the units and tens code drums. Relay 88 on becoming energized connects the contacts of the tens drum 47 through the back contacts of contact members 61—65 of the letters code drum 45 to the distributor TD1 whereupon the tens digit (0) is transmitted to the receiving printer. In the next position of code drum 45, the circuit of relay 88 is interrupted at contact 67, and the units code drum 46 is thus connected to the distributor TD1 to send the units digit (1). Before the next units digit is sent in the second cycle of operation of the numbering machine, the units code drum 46 is turned by the Geneva cam 51 and the wheel 52 to set up the code combination corresponding to the figure 2. The tens code drum 47 is similarly stepped by the Geneva cam 53 and wheel 54 from one angular position to the next to change the code combination to represent successive figures after each ten revolutions of the code drum 45.

In the ninth position of the code drum 45, the contact member 66 engages its back contact, thereby applying ground potential to the make contacts of the respective contact members 61—65 which are selectively operated to set up on the distributor TD1 the code combination corresponding to the "letters shift." The receiving printer RPR1 is thus placed in condition to receive and record the message group of signals. The tenth or last signal sent during each cycle of operation may be a blank and as the code drum 45 is stepped from its tenth position to its initial or starting position, the contact member 68 is operated to apply ground potential momentarily to conductors 96 and 112. As the conductor 96 is connected to the winding of relay 40, this relay is short-circuited and becomes deenergized, thereby interrupting the above-described circuits of relays 41 and 43. Relays 41 and 43 become deenergized thereby disconnecting the numbering mechanism N1 from the distributor TD1 and connecting the transmitter T1A to said distributor.

Upon the deenergization of relay 40, the circuit of the stepping magnet 37 of transmitter T1A is interrupted, whereupon said magnet becomes deenergized and the contact tongues 30 take their positions according to the next character code combination in the tape. The stepping magnet 37 is connected through the inner armatures and back contacts of relays 41 and 97 to the local segment 90 and the contact tongues similarly to the transmitting ring segments 93 of the distributor TD1, whereupon the transmission of the message stored in the tape is effected in the usual manner under the control of the distributor.

At the end of the message group of signals an end-of-message signal in which only the second pulse is a marking impulse is sent by the transmitter T1A. This signal causes baffle relay 32 to become energized while relays 31, 33, 34 and 35 are deenergized and a circuit is closed from battery through the lower armature and back contact of relay 31, the lower armature and front contact of relay 32 and the lower armatures and back contacts of relays 33, 34 and 35 to the winding of transfer relay 97. The function of relay 97 is to disconnect the distributor TD1 from transmitter T1A and connect the same to the switchboard if a message is awaiting transmission from one of the repeater transmitters TT1, TT2 or TT3. If no message for that channel is awaiting transmission from the switchboard storage transmitters, the circuit of relay 97 is broken at the switchboard and the relay does not become energized. A second message may therefore be transmitted from the local position transmitter T1A as described above, and the succeeding messages will be preceded by the service code signals transmitted by the numbering mechanism N1 in each instance.

If a message has been received and stored by one of the reperforators, for example, reperforator R2, the switching operator notes the destination of the message and knowing that it should be sent over channel A of distributor TD1, plugs the transmitter TT2 into one of the jacks, for instance, the jack J10 of said channel. The insertion of the plug MP2 into the jack J10 closes the contacts of switch 101 and connects the transmitter TT2 through the contacts of the plug and jack, the cable 100, the contacts of relay 103 when energized and cable 104 to the front contacts of relay 97. When the transmission of the previous message sent from the local position has been completed, the end-of-message signal causes the energization of relay 32, and the transfer relay 97 becomes energized through a circuit including the contacts of relays 31—35, inclusive, conductor 98, contacts 101 of the jack J10 and the outer armature and back contact of relay 107. The energization of relay 97 disconnects the transmitter T1A from the distributor TD1 and connects thereto the transmitter TT2 which is plugged into the switchboard, the transmitting and stepping magnet circuits however remaining open until relay 103 becomes energized as described below.

Each of the other jacks J1 and J100 has associated therewith relays 203 and 303, respectively, corresponding to relay 103 and said relays are arranged to connect the jacks to the distributor TD1, one at a time, if transmitters are plugged into more than one jack at the same time. The connecting relays 103, 203, 303, are deenergized, however, while the numbering mechanism N1 is operative.

Relay 97 locks as battery is applied through its left hand armature and front contact. Upon the energization of relay 97, a circuit is closed from battery through its outer armature and front contact, conductor 105, the inner armature and back contact of relay 206, the second armature and back contact of relay 306, the winding of slow-acting relay 106, the back contact and inner armature of relay 107, and contacts 101 of the jack to ground at the key 108. Relay 106 becomes energized and opens at its inner armature and back contact and at its fourth armature and back contact the circuits of relays 306 and 206, respectively, so that these relays cannot become energized if a plug is inserted in jack J1 or J100 before transmission is completed from transmitter TT2.

Since the message stored in transmitter TT2 is preceded by the special signal in which the fourth pulse is a marking impulse, upon the transmission of this signal a circuit is closed from battery through the second armature and front contact of relay 106, the upper armatures and back contacts of relays 131—133, the upper armature and front contact of relay 134, the upper armature and back contact of relay 135, conductor 109 and the winding of relay 110 to ground whereupon relay 110 becomes energized and is locked up through a locking circuit including its left hand armature and front contact. Relay 110 remains locked up until the conductor 109 is grounded through conductor 112 and contact 68 after the numbering machine N1 has completed its function as described above.

The energization of relay 110 energizes relay 43 through a circuit including conductors 42 and 111 and the right hand inner armature and front contact of relay 110 to connect the numbering device N1 to the distributor TD1. The energization of relay 110 also opens at its right hand inner armature and back contact the circuit of relay 103 controlling the connection of the repeater transmitter TT2 to the distributor TD1, and closes a circuit through its right hand outer armature and front contact and the third armature and front contact of relay 106 for energizing magnet 137 and stepping the tape in transmitter TT2 to the next character.

Upon the energization of relay 43, the operation of the numbering mechanism N1 is initiated as described above and the mechanism sends the group of service code signals to the line and then momentarily applies ground potential to the conductor 112 at the contact 68 to effect the deenergization of relay 110. The deenergization of relay 110 opens at its outer right hand armature and front contact the circuit of stepping magnet 137 of transmitter TT2 whereupon the tape transmitter tongues are positioned for the next character. A circuit is also closed through the right hand inner armature and back contact of relay 110, the winding of relay 103 and the outer armature and front contact of relay 106 to ground whereupon relay 103 becomes energized and connects the transmitting contacts and stepping magnet 137 of transmitter TT2 to the transmitting and local segments of the distributor TD1 and transmission of the message stored in the tape at the repeater transmitter is effected in the usual manner.

The message is followed by an end-of-message signal causing relay 132 of baffle relay group 131—135 to become energized while relays 131, 133, 134 and 135 are deenergized. A circuit is then closed from ground through the lower armature and back contact of relay 131, the lower armature and front contact of relay 132 and the lower armatures and back contacts of relays 133, 134 and 135 to battery through the winding of relay 107 whereupon said relay becomes energized and locks up through a circuit including its right hand inner armature and front contact, contacts 101 of the jack J10 and key 108. At its left hand armature and front contact, relay 107 closes a circuit from battery through the signal lamp 115, #6 conductor of cable 100, jack J10, plug MP2 and stepping magnet 137 of transmitter TT2 to ground whereupon the stepping magnet 137 becomes energized, the tape is advanced to clear the end-of-message signal, and the lamp 115 is lighted to indicate to the switching operator that transmission of the message by the transmitter TT2 has been completed. The energization of magnet 137 breaks the circuit of baffle relay 132 but relay 107 remains locked up through the contacts 101 of the jack and the key 108.

The energization of relay 107 also interrupts at its right hand inner armature and back contact the circuit of relay 106 whereupon said relay becomes deenergized and opens at its outer armature and front contact the circuit of relay 103 to disconnect the transmitter TT2 from the distributor and render the same available immediately for the transmission of another message over channel A. The energization of relay 107 further interrupts at its right hand outer armature and back contact the above-described circuit of relay 97, and if neither of the other transmitters TT1 or TT3 has been plugged into the switchboard, relay 97 becomes deenergized and reconnects the local tape transmitter T1A to the distributor TD1.

Upon the lighting of the signal lamp 115, the switching operator withdraws the plug MP2 from the jack J10 if there is no other message stored in the tape in transmitter TT2 or if the next message is for a destination reached by another channel, thereby opening the locking circuit of relay 107 at the contacts 101 of the jack. Relay 107 becomes deenergized and opens at its left hand armature and front contact the circuit of lamp 115 and of the stepping magnet 137 of the transmitter TT2. If there is a message in the tape to be transmitted over the same channel as the previous message, it is unnecessary to withdraw the plug from the jack. The switching operator actuates the key 108, opening the circuit of relay 107 whereupon the lamp 115 is extinguished and the stepping magnet 137 is deenergized, setting the transmitter tongues on the next selection. Relay 106 becomes energized when the key 108 is released and the transmission of the second message proceeds in the manner described above. If there is a message in the tape to be repeated over another channel, it is necessary to insert the plug MP2 in a jack allocated to said other channel, upon which the message is automatically repeated over said channel.

If another transmitter is plugged into a jack, for example the jack J1, leading to the same channel while the transmitter TT2 is sending over the channel, a parallel holding circuit for relay 97 is closed through conductor 98, contacts 201 of the jack J1 and the right hand outer armature and back contact of relay 207. Relay 97 thus remains energized when its circuit through the contacts of relay 107 is interrupted as described above after transmission of the first message is completed, and the distributor TD1 remains connected to the switchboard to take care of the additional message awaiting transmission at the switchboard.

When relay 106 becomes deenergized as described above at the end of the message sent by the transmitter TT2, a circuit is closed from battery through the right hand outer armature and front contact of relay 97, conductor 105, the fourth armature and back contact of relay 106, the fourth armature and back contact of relay 306, the winding of relay 206, the right hand inner armature and back contact of relay 207, contacts 201 of the jack J1 and key 208 to ground, whereupon relay 206 becomes energized. The energization of relay 206 opens at its inner armature and back contact the circuit of relay 106, and at its second armature and back contact the circuit of relay 306 to prevent seizure of the channel by transmitters plugged into the jacks J10 and J100 before transmission of the message has been completed by the transmitter plugged into the jack J1. The energization of relay 206 further initiates the operation of the service and message number code transmitter and of the transmitter plugged into the jack J1 as described above in connection with relay 106 associated with jack J10.

If transmitters had been plugged into both jacks J1 and J100 during the transmission by transmitter TT2, first the transmitter plugged into jack J1 and then the transmitter plugged into jack J100 would be rendered operative. In order to accomplish this result, relays 106 and 306 are slow-acting relays, relay 106 being slower than relay 206 and relay 306 being slower than relay 106. At the end of the message being sent by transmitter TT2, relay 106 becomes deenergized as described above. Assuming that transmitters have been plugged into both jacks J1 and J100, the circuits of relays 206 and 306 will be closed simultaneously upon the deenergization of relay 106. The circuit of relay 206 may be traced through key 208, contacts 201 of the jack J1, the right hand inner armature and back contact of relay 207 and the fourth armatures and back contacts of relays 306 and 106, respectively. The circuit of relay 306 may be traced through the key 308, contacts 301 of the jack J100, right hand inner armature and back contact of relay 307, inner armature and back contact of relay 106 and second armature and back contact of relay 206 to battery at the contacts of relay 97.

Since relay 206 is faster than relay 306, the former becomes energized and interrupts at its second armature and back contact the circuit of relay 306. The transmitter plugged into jack J100 is thus held inoperative until the transmitter plugged into jack J1 has completed its function. It will be noted that the respective circuits of each of the relays 106, 206 and 306 include back contacts of each of the other relays so that only one of said relays is energized at the same time. It will be obvious, therefore, that if more than one transmitter is plugged into the jacks J1, J10, J100 when relays 41 and 97 are energized to transfer the distributor TD1 from the local transmitter T1A to the switchboard, the connected transmitters will be rendered operative one after the other in response to the successive operation of relays 106, 206 and 306.

Since relay 106 is faster than relays 206 and 306, and relay 206 is faster than relay 306, the transmitter plugged into jack J1 will take precedence over those plugged into jacks J10 and J100, and the transmitter plugged into jack J10 will take precedence over that plugged into J100. This feature of the invention is advantageous for example in a system where it is desired that a certain selected switchboard position have preferred access to outgoing channels.

In the case of incoming messages over the multiplex or other inter-city trunk channels, the messages may be received on storage units having associated repeater transmitters connected to plugs adapted to be inserted into the jacks in the switchboard for relaying the messages over a selected channel as in the case of messages received from the branch offices. Thus messages received over channel B of the receiving distributor RD2 (Fig. 4) are stored by the storage unit MR (Fig. 3) which may be a tape reperforator.

The tape transmitter TT11 associated with the storage unit MR may be connected by means of the multiple conductor plug MP11 and jack J11 corresponding to jacks J1, J10 and J100, or any of the other switchboard jacks, to the desired channel. The transmitter TT11 and connecting plug MP11 are similar to the transmitters TT1, TT2 and TT3, and the associated plugs MP1, MP2 and MP3. The advantages accruing from the use of uniform or similarly constructed apparatus units and switchboard circuits for handling messages from both simplex lines and multiplex channels will be obvious. From a practical standpoint the use of repeater units adapted to operate in conjunction with the multiplex distributors without intermediate storing or synchronizing apparatus is also of great importance. The operation of the repeater transmitter TT11 and associated switchboard apparatus involved in relaying messages being the same as in the case of the transmitter TT1 described above, a detailed description thereof is unnecessary.

In the system shown in Figs. 3, 4 and 5, as stated above the sequence of operation in case more than one repeater transmitter is plugged into the same channel is such that certain jacks in the switchboard take preference over other jacks. If desired, the system may be arranged to render the transmitters connected to a channel operative in a predetermined order. This modification is illustrated in Figs. 6 and 7, the general arrangement of the system shown in these figures of the drawings being similar to that shown in Figs. 3, 4 and 5, and described above. In Figs. 6 and 7 the service code transmitter N10 corresponds to the transmitter N1 of Fig. 5, the tape transmitter T4A to transmitter T1A of Fig. 4 and jacks J2, J20 and J200, like the jacks J1, J10 and J100, provide access to an outgoing multiplex channel, in this case channel A of the multiplex distributor TD4. The distributor TD4 is similar to the distributor TD1 except that it is provided with two local segments 90a, 90b for each channel. The other elements of the system shown in Figs. 6 and 7 having corresponding elements in the system shown in Figs. 3, 4 and 5 are designated by the same reference numerals with the suffix a.

In order to render the transmitters plugged into the jacks J2, J20 and J200 operative in a predetermined order, a sequence control switch such as a rotary step-by-step switch is provided having three contact arms 120, 121 and 122. A control relay 123 is arranged to control the circuit of the switch stepping magnet 124 which is adapted to actuate the contact arms 120, 121 and 122, stepping the arms from one set of bank contacts to the next when the magnet is deenergized. The stepping magnet 124 is connected through the armature and back contact of relay 123 and conductor 125 to the local segment 90b of distributor TD4 whereby the switch is stepped during each revolution of the distributor brushes 91a so long as the relay 123 is deenergized. Relay 123 is connected to contact arm 120 of the sequence control switch and contact arms 121 and 122 are arranged to control through their associated bank contacts the circuits of relays 106a, 206a and 306a to initiate the operation of the transmitters plugged into the associated jacks. While only three jacks J2, J20 and J200 with their control circuits are shown, it will be apparent that any desired number of circuits may be provided in connection with the control switch.

When the switchboard circuits are idle, it will be remembered that relay 97a is deenergized. The contact arms of the control switch are stepped until the first row of the bank contacts is reached through the above-described stepping circuit. Upon the engagement of the contact arm 120 with its first contact, a circuit is closed from battery through the winding of relay 123, contact arm 120, conductor 126 and the outer armature and back contact of relay 97a to ground, whereupon relay 123 becomes energized and opens the circuit of the switch stepping magnet 124. The switch is thus prevented from stepping continuously during periods when the associated switchboard circuits remain idle.

As described above, when the end of a message being transmitted by the local transmitter T4A is reached, transfer relay 97a becomes energized if a repeater transmitter has been plugged into one of the jacks J2, J20 or J200 at the switchboard, the circuit of said relay including conductor 98a, contacts 101a of jack J20 and the armature and back contact of relay 107a (assuming that the repeater transmitter has been plugged into the jack J20). The energization of relay 97a interrupts the above-described circuit of relay 123, whereupon the circuit of stepping magnet 124 is closed and the contact arms 120, 121 and 122 are stepped from one set of bank contacts to the next. Upon the engagement of contact arm 120 with its third contact, the circuit of relay 123 is closed through the right hand inner armature and back contact of relay 107a, contacts 101a of jack J20 and key 108a whereupon the circuit of the stepping magnet 124 is interrupted and the stepping of the switch ceases. When the contact arms 121 and 122 engage their third contacts, a circuit is closed through the key 108a, contacts 101a of jack J20, right hand inner armature and back contact of relay 107a and contact arms 121 and 122 for energizing relay 106a. Relay 106a becomes energized and initiates the operation of the service code transmitter N10 and of the transmitter plugged into the jack J20 as described above in connection with the modification shown in Figs. 3, 4 and 5.

At the end of the message relay 107a becomes energized and interrupts the described circuits of relays 106a and 123 whereupon the circuit of the stepping magnet 124 is reclosed. If repeater transmitters had been plugged into both jacks J20 and J200, after the first message had been sent as described above, the stepping of the switch arms 120, 121 and 122 into engagement with their fourth contacts would close the circuits of relays 306a and 123, and the transmitter plugged into jack J200 would be rendered operative. If, on the other hand, while the arms of the sequence switch are on the first contacts, transmitters had been plugged into jacks J2 and J20 or J200 simultaneously, the transmitter connected to jack J2 would be rendered operative before either of the others. Thus the transmitters are rendered operative in predetermined order, depending upon their connection to the sequence control switch, when more than one transmitter is plugged into jacks allocated to the same channel at the same time. When all of the messages awaiting transmission at the switchboard have been sent, the relay 97a becomes deenergized when ground potential is removed from conductor 98a at the switchboard and the local transmitter T4A is reconnected to the distributor TD4.

As stated above, the more complete system shown in Fig. 2 embodies means for relaying messages to either multiplex channels or simplex branch office lines. The connections through the switchboard to multiplex channels may be effected by utilizing apparatus similar to that shown in Figs. 3, 4 and 5 or in the modification shown in Figs. 6 and 7. The apparatus involved in effecting connections to branch office simplex lines for the purpose of transmitting messages to the branch offices from the central office may be similar to that shown in Figs. 8 and 9.

Referring to these figures of the drawings, a branch office BO10 is shown in Fig. 8. The printer PR at this branch office is connected to an idle reperforator R10 at the central office upon actuating a key K. The finder switch SW10 for seizing an idle reperforator is similar to the finder switch SW1 or SW2 in Fig. 1. A tape transmitter TT10 associated with the reperforator R10 is connected to a multiple conductor plug MP10 which may be inserted in any one of the switchboard jacks to extend the call to an outgoing circuit or channel.

Assuming that it is desired to relay a message to a branch office BO11 accessible through the jacks J20, J31, the plug MP10 is inserted in one of said jacks, for example, jack J30. The operation of the switchboard apparatus is essentially the same as in the case of calls extended to multiplex channels as described above in connection with Figs. 3 to 7, inclusive. In the modification shown, the connection of the jacks to the selected simplex line when more than one plug is inserted in said jacks at the same time is controlled by a sequence switch as in the modification shown in Figs. 6 and 7. The local transmitter corresponding to the local transmitter T1A, T1B, etc. is omitted from the system shown in Figs. 8 and 9, but such a transmitter may be embodied in the system if desired.

Upon the insertion of the plug MP10 in the jack J30, a circuit is closed through the right hand outer armature and back contact of relay 107b, contacts 101b associated with jack J30 and the armature and back contact of relay 15b for energizing relay 97b. Relay 15b is associated with the finder switch SW of the called line and corresponds to relay 15 or relay 15a in Fig. 1. Since this relay is energized during the periods when the branch office operator is transmitting a message to the central office, relay 15b serves to prevent transmission from the central office to the branch office until the branch office operator releases the line by restoring key K to normal.

Upon the energization of relay 97b, the circuit of normally energized relay 223 is interrupted, thereby closing at the armature and back contact of relay 223 the circuit of the stepping magnet 224 of the sequence control switch embodying contact arms 220, 221 and 222. The stepping magnet 224 is intermittently energized by the interrupter 225 and steps the contact arms 220, 221 and 222 of the sequence switch from one row of bank contacts to the next. Upon the engagement of the contact arm 220 with the third bank contact, a circuit is closed from ground at the key 108b through contacts 101b of the jack J30, the inner right hand armature and back contact of relay 107b and the contact arm 220 for energizing relay 223. Relay 223 again becomes energized and opens the stepping circuit of the sequence switch, and the contact arms 220, 221 and 222 remain in engagement with the third row of bank contacts. Upon the engagement of the contact arms 221 and 222 with the third row of bank contacts, a circuit is closed from ground at the key 108b through contacts 101b of the jack J30, the inner right hand armature and back contact of relay 107b, contact arms 221 and 222 and the winding of relay 106b, whereupon this relay becomes energized.

The energization of relay 106b closes at its outer armature and front contact the circuit of relay 103b, whereupon this relay becomes energized and connects the tape transmitter TT10 to the start-stop distributor SSD1. This connection is only temporary and is for the purpose of clearing out any blank or other signals in advance of the special signal which precedes each message group of signals in the tape at said transmitter, the relay 103b being then deenergized to disconnect the tape transmitter until the service code transmitter N11 has completed its function.

Upon the transmission of the special signal preceding each message group of signals stored in the tape fed to the transmitter TT10, baffle relay 434 becomes energized while baffle relays 431, 432, 433 and 435 remain deenergized. Thereupon a circuit is closed from battery through the inner left hand armature and front contact of relay 106b, the upper armatures and back contacts of relays 431, 432 and 433, the upper armature and front contact of relay 434, the upper armature and back contact of relay 435 and conductor 112b for energizing relay 40b. Relay 40b becomes energized and locks up through a circuit including its left hand armature and front contact that is independent of the baffle relays 431 to 435. The energization of relay 40b also applies battery through its right hand outer armature and front contact, conductor 153, to the second armature and front contact of relay 106b, conductor #6 of cable 100b, jack J30 and plug MP10 for energizing the stepping magnet of the tape transmitter TT10 to withdraw the feeler pins and step the tape to the next character.

Upon the energization of relay 40b as above described, a circuit is closed through its inner right hand armature and front contact for energizing relay 43b to connect the service code transmitter and the numbering machine N11 to the start-stop distributor SSD1 associated with the outgoing simplex line to the called branch office BO11. As in the system shown in Figs. 3 to 7 inclusive, the repeater transmitter plugged into the switchboard is not connected to the circuit by relay 103b until the numbering mechanism has completed its function.

The start-stop distributor SSD1 embodies a latch magnet 160 adapted to control a rotatable brush arm 161 provided with brushes one pair of which engages the impulse or transmitting rings 162 and 163, and the other pair of which engages the stepping rings 164 and 165. As shown, the transmitting ring 162 comprises a rest contact segment R, the start segment S and five impulse segments. The brushes of the brush arm 161 normally rest upon the rest segment R in a position adjacent the start segment S whereby when the brush arm is released, the brushes will engage almost immediately with the start segment. The line relay 166 connected to the ring 163, therefore, normally maintains positive battery on the line L corresponding to the rest condition, but upon the energization of the latch magnet 160, the line circuit is opened while the brushes of the distributor are passing over the start segment, whereby the remote start-stop printer is started. After the start interval of nocurrent, the printer is adapted to respond to the selective impulses transmitted by line relay 166 as the distributor brushes pass over the five impulse segments. Synchronism may be maintained between the transmitting apparatus and the receiving printer in any manner customary in start-stop printer telegraph systems, as by operating the distributor of the receiving printer slightly faster than that of the transmitting apparatus so that the receiving distributor cam comes to rest at the end of each cycle and is released by the start impulse from the start-stop distributor SSD1.

A similar distributor SSD is provided in connection with each outgoing simplex line, the distributor SSD2 being individual to the branch office BO10. As shown, the line relay 167 connected to the distributor SSD2 controls the line conductor 154 extending through a contact of relay 97c to the selector magnet 22 of the receiving printer. The relay 97c corresponds to relay 97 of Fig. 4, 97a of Fig. 7, and 97b of Fig. 8. As shown in Fig. 8, relays 97b and 97c are provided with contacts adapted to connect the printer with the transmitting apparatus or with the receiving apparatus at the central office depending upon whether the relays are energized or deenergized. It is, therefore, impossible for the branch office operator at office BO10 to transmit to the central office during the time that the printer is connected to the start-stop distributor SSD2 at the central office, and as has been described above, it is also impossible for the central office to interrupt transmission from the branch office when the branch office has initiated a call to the central office.

Upon the energization of relay 43b, a circuit is closed through its outer right hand armature and front contact for energizing the latch magnet 160 of the start-stop distributor SSDI. The brush arm of the start-stop distributor is thereupon released and the transmission of the service code signals from the transmitter NII proceeds in the manner described above in connection with Figs. 3, 4 and 5, the code signals for each character having added to them the rest and start signals by the distributor SSDI in order to operate the start-stop printer at the called office. At the end of each revolution of the brush arm of the start-stop distributor, a circuit is closed from battery through ring 164, contact 170 of ring 165, conductor 171 and the inner armature and front contact of relay 43b for stepping the actuating magnet corresponding to the magnet 47 (Fig. 5) of the numbering mechanism NII.

When the numbering mechanism NII completes its cycle of operation, ground potential is applied as described above in connection with Fig. 5 to the conductor 96b, whereupon the relay 40b becomes deenergized and interrupts the circuit of relay 43b, thereby disconnecting the service code transmitter NII from the distributor SSDI. The deenergization of relay 40b also closed a circuit from ground through the outer armature and front contact of relay 106b, the winding of relay 103b, conductor 152 and the outer right hand armature and back contact of relay 40b to battery, whereupon relay 103b becomes energized. The energization of relay 103b connects the repeater transmitter TT10 to the start-stop distributor SSDI through the right hand armatures and front contacts of said relay and the cable 104b. The energization of relay 103b also closes a circuit through its left hand armature and front contact for energizing the latch magnet 160 of the start-stop distributor, whereupon the message stored in the tape at the transmitter TT10 is transmitted under the control of the distributor SSDI, the stepping magnet of the transmitter TT10 being connected through conductor #6 of cable 104b and the conductor 171 to the stepping segment 170 of the distributor.

At the end of the message the special end-of-message signal energizes relay 432 of the baffle relay group 431 to 435, the relays 431 and 433, 434 and 435 remaining deenergized. Thereupon a circuit is closed from ground through the lower armature and back contact of relay 431, the lower armature and front contact of relay 432 and the lower armatures and back contacts of relays 433, 434 and 435 to battery through the winding of relay 107b, whereupon this relay becomes energized. Relay 107b corresponds to relay 107 of Fig. 3 and effects the lighting of the supervisory lamp 115b and the release of the selected circuit in the same manner as described above in connection with the modification shown in Figs. 3, 4 and 5. The switching operator withdraws the plug MP10 to restore the switching apparatus to normal. If the next following message in tape transmitter TT10 is destined for the same branch office, the switching operator does not withdraw plug MP10 but opens key 108b momentarily, thus restoring the switching apparatus to normal and putting it in condition to send another message. In case the operator at the branch office BO10 is sending a message, upon completion of the message she restores the key K to normal, relay 15c becomes deenergized and closes the circuit of relay 97c whereupon the circuit to the branch office BO10 becomes accessible to calls originating from the central office as just described for branch office BO11.

The central office transmitting equipment associated with each of the branch office lines is similar to that shown in the upper half of Fig. 9, the corresponding transmitting apparatus units associated with the branch office line to branch office BO10 being shown in the lower half of Fig. 9. Similarly the branch office equipment and the central office equipment for receiving messages from the branch office are the same as shown in the lower part of Fig. 8 for each of the branch offices.

In the case of messages originating at a remote office and received on a multiplex channel terminating at the central office, the messages are stored and repeated as described above by a reperforator and associated tape transmitter, such as the multiplex reperforator MR and the tape transmitter TT11 shown in Fig. 3. In order to transmit the message to one of the branch offices, the multiple conductor plug MP11 is inserted into a jack switch, as the jack J30 or J31, individual to the desired branch office line. Thereupon the message is transmitted in the same manner as in the case of a message originating at a branch office. Thus the system described has the advantage that the repeater transmitter either such as TT1 associated with branch office lines, or TT11 associated with multiplex channels, may be inserted into jacks allocated to either outgoing simplex lines or outgoing multiplex channels, although the transmission over the simplex lines is effected by the use of start-stop signals and synchronism is maintained on the multiplex channels by separate means so that start-stop signals are not required. This is an important feature of the invention as it greatly simplifies the system and results in a large saving in the cost of apparatus and maintenance.

While several systems embodying the invention have been described in order to illustrate the various features thereof, it will be obvious that many changes and further modifications may be made without departing from the scope of the invention as defined in the appended claims. Certain features of the invention are applicable to other systems than those for handling telegraph messages, for example where a signal or a group of signals has to be repeated at an intermediate point irrespective of the character or purpose of such signals. Thus the invention may be embodied in a facsimile transmission system, and the term "message signals" in the claims is intended to include facsimile signals.

We claim:

1. In a telegraph system, a central station, a plurality of telegraph channels terminating at said central station, a plurality of character storage devices for storing character signals received over incoming channels, a transmitter associated with each storage device for repeating signals stored therein and manually operable switching means for connecting each of said transmitters to any one of a plurality of outgoing telegraph channels.

2. In a telegraph system, a central station, a plurality of telegraph channels terminating at said central station, a plurality of character storage devices for storing character signals received over incoming channels, a transmitter associated with each storage device for repeating signals stored therein, manually operable switching means for connecting each of said transmitters to any one of a plurality of outgoing telegraph channels, and means for initiating the operation of said transmitters when the same are connected to an outgoing channel.

3. In a telegraph system, a central station, a plurality of telegraph channels terminating at said central station, combined signal storage and repeating means at said central station for storing and repeating character signals received over incoming channels and switching means including a connecting plug individual to each repeating means for connecting said repeating means to any one of a plurality of outgoing telegraph channels.

4. In a telegraph system, a central station, a plurality of telegraph channels terminating at said central station, unitary signal storage and repeating means at said central station for storing and repeating character signals received over one of said channels and switching means including a connecting plug individual to said repeating means for connecting said repeating means to any one of a plurality of outgoing channels, said connecting plug being provided with a series of contacts corresponding to the several transmitting contacts of the repeating means.

5. A telegraph system having, in combination with a transmitting unit and a plurality of receiving printer units, a channel to each of said printer units, means to store all or a part of a message and transmit the same over any of said channels and means for automatically initiating the operation of said transmitting means as soon as the selected channel is idle.

6. In a telegraph system, a central station, other stations, a plurality of telegraph channels connecting said other stations to said central station, storing means at said central station for storing character signals received over incoming channels, means to select one of said other stations and means to transmit the stored signals thereto either before or after completing the storage of a message.

7. In a communication system, a central station, a plurality of communication lines, storing means at said central station for storing character signals received over said lines, switching means for selecting one of said lines over which said signals are to be retransmitted and retransmitting means controlled by said switching means for repeating said signals over a selected line.

8. A telegraph system having, in combination with a transmitting unit and a plurality of receiving printer units, a channel to each of said printer units and means controlled by said transmitting unit to store all or a part of a message and transmit the same over any of said channels as soon as the selected channel is idle.

9. A telegraph system having, in combination with a transmitting unit and a plurality of receiving printer units, a channel to each of said printer units, selective switching means for connecting said transmitting unit to any desired one of said channels and means individual to each channel for interposing predetermined character signals between the groups of signals forming the messages.

10. A telegraph system having, in combination with a transmitting unit and a plurality of receiving printer units, means for selectively connecting said transmitting unit to a desired one of said printer units to send a message and means for consecutively numbering each message to each printer unit comprising means for automatically interposing number code signals between messages.

11. A system for relaying messages electrically from one point to another comprising means for storing and retransmitting signals forming a message, a plurality of receiving units, a channel to each of said units, manually operable switching means for selecting any of said channels and means to render the retransmitting means operative to relay the message over a selected channel as soon as the same is idle.

12. A system for relaying messages electrically from one point to another comprising means for receiving, storing and retransmitting signals forming a message, manually operable means for connecting said retransmitting means to any one of a plurality of outgoing channels and means for thereafter automatically initiating transmission over the selected channel.

13. The method of relaying telegraph messages through stations or offices intermediate the origin and destination which comprises storing and reproducing at least a part of the message at the intermediate station or office, extending the communication circuit manually to the proper outgoing channel and automatically seizing the channel and initiating retransmission thereover as soon as the same is idle.

14. A telegraph system comprising a plurality of stations, channels connecting said stations, means at one of said stations for automatically storing a message received over an incoming channel and retransmitting the same over a desired one of the outgoing channels and manually operable means for selecting the outgoing channel.

15. A telegraph system comprising a plurality of stations, channels connecting said stations, a plurality of receiving-storing devices at one of said stations for simultaneously storing messages received over incoming channels, manually operable means at said one of said stations for selecting outgoing channels over which the stored messages are to be relayed and means operating automatically to free each channel upon the completion of the transmission of a message thereover from one of said devices and initiate the transmission of another message stored upon another of said devices.

16. A telegraph system comprising means for storing signals representing a message, a transmitter operatively associated with said storing means, said transmitter being provided with a connecting plug, a plurality of outgoing channels terminating in jacks adapted to receive said plug and means for maintaining said transmitter inoperative when plugged into a busy channel and for rendering said transmitter operative upon completion of the transmission of the message being sent over said channel.

17. A telegraph system comprising means for storing signals representing messages, transmitters operatively associated with said storing means, each transmitter being provided with a connecting plug, an outgoing channel terminating in multipled jacks adapted to receive said plugs and means for successively rendering said transmitters operative to send messages stored simultaneously in sequence over said channel.

18. A telegraph system comprising a plurality of signal transmitters, a plurality of signal receivers, manually operable connecting means associated with said transmitters for connecting more than one of said transmitters at the same time to any one of said receivers and means for rendering said connected transmitters operative in sequence.

19. In a telegraph system comprising a plurality of signal transmitters, a plurality of signal receivers, manually operable connecting means for connecting more than one of said transmitters to any one of said receivers, means for rendering the connected transmitters operative in sequence and means for numbering in sequence the messages sent by said transmitters irrespective of the order in which the transmitters are connected to the receiver.

20. A telegraph system comprising a plurality of signal transmitters, a plurality of signal receivers, manually operable connecting means for connecting more than one of said transmitters to any one of said receivers, means for rendering said connected transmitters operative in sequence and means independent of said transmitters for adding supplemental character signals to each message group sent by each transmitter.

21. In a telegraph system, a central station, a plurality of telegraph channels terminating at said central station, character storage devices for storing characters received over said channels, means operatively associated with said character storage devices for retransmitting message groups of characters stored therein and means at said central station for adding supplemental character signals to each message group.

22. A telegraph system comprising a transmission channel, a plurality of jacks forming multipled terminals for said channel, a plurality of code signal transmitters each provided with a connecting plug adapted to be inserted in one of said jacks to connect the associated transmitter with said channel, and means including relays having different operating characteristics associated with the respective jacks for rendering the transmitters operative one at a time when more than one transmitter is simultaneously connected to said channel.

23. A telegraph system comprising a transmission channel, multipled terminals for said channel, a plurality of code signal transmitters, selective switching means for connecting any of said transmitters to a terminal of said channel and operative to connect more than one transmitter simultaneously to said channel, and sequential circuit-closing means for rendering each of a plurality of simultaneously connected transmitters operative in predetermined order.

24. A telegraph exchange system comprising a central station, telegraph lines terminating thereat, a plurality of reperforators at said station, a finder switch individual to each of said lines, the contacts of said switches being connected in multiple to said reperforators, stepping magnets for the respective switches, a relay associated with each switch and arranged to control the respective magnets, a relay individual to each reperforator, means including the last-mentioned relays to indicate the idle or busy condition of the associated reperforator, means including said relays and magnets for connecting calling lines to idle reperforators and means including said reperforators for selecting desired ones of said lines and repeating message signals thereover.

25. A telegraph exchange system comprising a central station, telegraph lines terminating thereat, printers on said lines remote from said station, a plurality of reperforators at said station, means including finder switches for connecting any of said lines to an idle reperforator when it is desired to transmit a message from one of said printers, means associated with each printer to indicate the connection of the line to an idle reperforator and transmitting means individual to each of said reperforators for repeating message signals.

26. A telegraph exchange system comprising a plurality of storage units for storing message groups of signals, signal repeating means including transmitters operatively associated with the respective storing units for relaying the signals stored in said units, each of said transmitters being provided with a plurality of contact terminals, outgoing lines each provided with a transmitting multiplex distributor, each distributor having transmitting contact groups forming separate transmitting channels, and selectively operable switching means for connecting the contact terminals of any transmitter to any one of the contact groups of the multiplex distributor.

27. A telegraph exchange system comprising a plurality of transmitters each having a plurality of contact terminals and adapted to send permutation code signals, outgoing lines each provided with a transmitting multiplex distributor having contact groups forming separate transmitting channels and selectively operable switching means for connecting the respective contact terminals of any transmitter to the respective contacts of any one of the contact groups of said distributors.

28. A telegraph exchange system comprising signal transmitters, a plurality of telegraph transmitting channels, manually operable switching means for connecting any of said transmitters to any one of said channels and means responsive to the transmission of a predetermined signal for releasing a channel connected to one transmitter and rendering the same available to another transmitter.

29. A telegraph exchange system comprising signal transmitters, a plurality of telegraph transmitting channels, manually operable switching means for connecting any of said transmitters to any one of said channels and means responsive to the transmission of an end-of-message signal by a transmitter connected to one of said channels for releasing said one of said channels.

30. A telegraph exchange system comprising a tape transmitter, a strip of tape therefor, means for recording a plurality of groups of message signals on said tape, a plurality of transmitting channels, means for connecting said transmitter to any of said channels and means including said tape for stopping the transmitter at the end of each group of message signals.

31. A telegraph exchange system comprising a plurality of channels, a storage transmitter, means for connecting said transmitter to any of said channels, a numbering machine, means for operating the numbering machine to transmit consecutive numbers, means for initiating the operation of the numbering machine upon the occurrence of a predetermined signal preceding the message group of signals and means for initiating the operation of the storage transmitter after the numbering machine has completed its function.

32. A telegraph exchange system comprising a plurality of signal storage and repeating units each including a transmitter, a plurality of telegraph channels, selective switching means for interconnecting said units and said telegraph channels and means responsive to an end-of-message signal appended to a message group of signals for locking one of said transmitters against operation until manually released.

33. A telegraph exchange system comprising a plurality of transmission channels, a plurality of tape transmitters, manually operable means for selecting a desired channel and automatic means for rendering said transmitters operative to send over a selected channel when the same becomes idle and for releasing said channel after transmission of a message group of signals by one of said transmitters.

34. A telegraph exchange system comprising a central office, telegraph channels terminating thereat, a local transmitter at said office, a plurality of repeater transmitters, means for operating said repeater transmitters to repeat message signals originating at remote offices and means for rendering said local transmitter inoperative to transmit over one of said channels when any of said repeater transmitters is connected to or is awaiting connection to said channel.

35. A telegraph exchange system comprising a central office, telegraph channels terminating thereat, a plurality of transmitters, means for connecting said transmitters to any of said channels, means for operating the transmitters to send message signals and means for rendering one of said transmitters inoperative to transmit over one of said channels when another of said transmitters is connected to or is awaiting connection to said one of said channels.

36. A telegraph exchange system comprising a central office, outgoing telegraph channels terminating thereat, a plurality of transmitters, means for connecting any of said transmitters to any of said channels and means to render one of said channels accessible to one of said transmitters only when there is no message awaiting transmission over said channel at others of said transmitters.

37. A telegraph exchange system comprising a central office, incoming and outgoing telegraph channels terminating thereat, a local transmitter at said office, a switchboard in said office for selecting desired ones of said outgoing channels, means for repeating message signals received over incoming channels through the switchboard into outgoing channels and means for disconnecting said local transmitter from an outgoing channel at the end of a message and connecting said outgoing channel to the switchboard if a message received over an incoming channel is awaiting transmission over said outgoing channel.

38. A telegraph exchange system comprising a central office, incoming and outgoing telegraph channels terminating thereat, a local transmitter at said office adapted to transmit message signals over one of said outgoing channels and means dependent upon the operation of said transmitter for interconnecting said one of said outgoing channels and any of said incoming channels and relaying message signals from an incoming to said outgoing channel.

39. A telegraph exchange system comprising a central office, an outgoing telegraph channel, a plurality of transmitters and means for connecting any of said transmitters to said channel, said means being adapted to give a group of said transmitters precedence over another transmitter when a plurality of the last-mentioned transmitters are awaiting connection to the same channel.

40. A telegraph exchange system comprising transmission channels, a plurality of transmitters, selective switching means for interconnecting said transmitters and said channels, means for controlling said switching means and means whereby said controlling means is responsive to code signals of predetermined character preceding and following each group of message signals.

41. The method of handling messages in a telegraph communication system which comprises storing a message group of signals in mechanical form at a point intermediate the originating and final offices, manually selecting at the intermediate point a relay channel for relaying signals and automatically repeating the signals over the selected channel when the latter is idle.

42. A telegraph exchange system comprising a central station, branch office start-stop channels terminating at said central station, interoffice trunks provided with multiplex distributors at said central station, both said start-stop channels and multiplex channels being connected to signal storage units, each of the multiplex and start-stop storage units being operatively associated with a transmitter, the transmitters of both types of storage units being of the same character, and manually operable switching means for connecting any of said transmitters to any of said branch office channels or interoffice trunks.

43. A telegraph exchange system comprising a plurality of telegraph channels, a multiplex distributor associated with one channel, a start-stop distributor associated with another channel, a storage unit transmitter, a connecting plug connected to said transmitter and means including said transmitter for controlling either of said distributors through said connecting plug.

44. A telegraph exchange system comprising a plurality of channels, a multiplex distributor associated with one channel, a start-stop distributor associated with another channel, separate jacks forming terminals of the respective distributors, a storage transmitter having a plurality of contacts corresponding to the units of a telegraph code and a connector plug connected to said transmitter and having contacts connected to the respective transmitter contacts, both of said jacks being constructed to receive said connector plug and thereby connect the transmitter to either distributor.

45. A telegraph exchange system comprising a central station, a branch office, a line connecting a printer at the branch office to the central station, means at the central station for receiving messages over said line, means including said printer at the branch office for receiving messages over said line, other telegraph channels terminating at the central station, means at the central station for interconnecting certain of said channels and said branch office line, and means for preventing connection to the branch office line when the branch office is transmitting a message to the central station.

46. A telegraph exchange system comprising a central station, a branch office, a line connecting a printer at the branch office to the central station, means at the central station for receiving messages over said line, means including said printer at the branch office for receiving messages over said line, other telegraph channels terminating at the central station, means at the central station for interconnecting certain of said channels and said branch office line, and means for preventing transmission from the branch office to the central office when the branch office line is connected to one of said channels for transmission of a message to the branch office.

47. A telegraph exchange system comprising a central station, multiplex channels terminating at the central station, a start-stop printer and selective switching means at the central station for interconnecting two of said multiplex channels or one of said multiplex channels and said printer.

48. A telegraph exchange system comprising a central station, multiplex channels terminating at said central station, branch offices provided with start-stop printers, telegraph lines connecting said branch offices to said central station, and switching means at the central station for interconnecting two of said multiplex channels and two of said branch office lines to relay messages from one multiplex channel to another or from one branch office to another branch office.

49. A telegraph exchange system comprising a central station, multiplex channels terminating at said central station, branch offices provided with start-stop printers, telegraph lines connecting said branch offices to the central station, and switching means at the central station for interconnecting any multiplex channel to any other multiplex channel or any branch office line and for interconnecting any branch office line to any multiplex channel or any other branch office line.

50. A telegraph exchange system comprising a central station, telegraph channels terminating at said station, start-stop telegraph apparatus connected to certain of said channels, means for sending start-stop signals over said certain channels to control said apparatus, switching means for interconnecting said certain channels with each other to relay messages thereover, and means for interconnecting one of said start-stop channels with one of the other channels and for converting the start-stop signals into signals of a different character to relay messages transmitted over said one of the start-stop channels over one of the other channels.

51. A telegraph exchange system comprising telegraph circuits, means for transmitting start-stop code signals over certain of said circuits, means for transmitting permutation code signals of different character over other of said circuits, tape reperforators for storing the signals received over all of said circuits, outgoing telegraph channels, selective switching means for connecting to a desired one of said channels and means including tape transmitters for converting the stored signals of each type into signals of the same character and repeating the same over a selected channel.

52. In combination, code signal storage and repeating apparatus, said apparatus comprising a plurality of selectively operable contacts corresponding to the units of the transmitting code, a connecting plug having contacts connected to the first-mentioned contacts, a multiplex distributor having transmitting segments corresponding to the units of the transmitting code and a jack adapted to receive said plug, said jack being provided with contacts connected to the transmitting segments of said distributor.

53. In combination, a tape reperforator and an associated tape transmitter, said transmitter being provided with five transmitting contacts and a stepping magnet, a multiplex distributor having five transmitting segments forming a channel and a local segment, switching means for associating the transmitter with said channel of the distributor and automatic means for thereafter connecting the contacts of the transmitter to the corresponding segments of the distributor and the stepping magnet to the local segment.

54. In combination, a tape reperforator and an associated tape transmitter, said transmitter being provided with five transmitting contacts and a stepping magnet, switching means for connecting said transmitter to a selected circuit or channel and means including a start-stop distributor between said transmitter and said circuit or channel for adding start-stop pulses to the five unit code signals transmitted over said circuit or channel by said transmitter.

55. In a telegraph system, a central station, a plurality of telegraph channels terminating at said central station, character storage devices for storing characters received over said channels, means associated with said character storage devices for retransmitting message groups of characters stored therein, means for preceding each message group with identifying code signals differing for successive messages and means for automatically initiating the operation of said last mentioned means.

56. A telegraph exchange system comprising a central office, incoming and outgoing telegraph channels terminating thereat, a switchboard for interconnecting said channels to relay messages through said office, a local transmitter adapted to transmit over one of said outgoing channels and means to render said one of said outgoing channels accessible to said transmitter when there is no message awaiting transmission over said channel at the switchboard.

57. A telegraph exchange system comprising a central office, a plurality of outgoing channels terminating thereat, transmitters for sending message signals over said channels, means for connecting any one of the transmitters to any of said channels and means for controlling said connecting means to give one of the transmitters precedence over the others whenever a plurality of transmitters are awaiting connection to the same channel.

58. In a multi-office telegraph exchange system, a plurality of offices provided with printers, manually operable means at an intermediate office for selecting a trunk to a remote office and relaying message signals received from another remote office, means for releasing the selected trunk and means whereby said releasing means is controlled by an end-of-message signal.

59. A telegraph system comprising a plurality of signal transmitters, a plurality of signalling circuits, connecting means for connecting more than one of said transmitters at the same time to any one of said circuits, means for operating said transmitters to transmit signals over said circuits either simultaneously or at different times and means for rendering the transmitters that may be connected at any time to the same circuit operative in sequence.

60. A multi-office telegraph communication system comprising means for storing message groups of signals at a point intermediate the originating and final offices of the system, means controlled at said intermediate point for selecting a relay channel for the stored signals and means for automatically repeating signals over a selected channel as soon as the latter becomes idle.

EVAN R. WHEELER.
RAY HOOVER.
ROBERT F. DIRKES.